United States Patent
Guo et al.

(10) Patent No.: US 12,101,720 B2
(45) Date of Patent: Sep. 24, 2024

(54) POWER SAVING SCHEMES IN WIRELESS COMMUNICATION

(71) Applicant: ZTE Corporation, Guangdong (CN)

(72) Inventors: Qiujin Guo, Guangdong (CN);
Mengzhu Chen, Guangdong (CN); Hao Wu, Guangdong (CN); Jun Xu, Guangdong (CN); Xiaoying Ma, Guangdong (CN)

(73) Assignee: ZTE Corporation, Shenzhen (CN)

( * ) Notice: Subject to any disclaimer, the term of this patent is extended or adjusted under 35 U.S.C. 154(b) by 328 days.

(21) Appl. No.: 17/673,178

(22) Filed: Feb. 16, 2022

(65) Prior Publication Data

US 2022/0182942 A1 Jun. 9, 2022

Related U.S. Application Data

(63) Continuation of application No. PCT/CN2019/101017, filed on Aug. 16, 2019.

(51) Int. Cl.
*H04W 52/02* (2009.01)
*H04B 7/0413* (2017.01)
*H04W 76/28* (2018.01)

(52) U.S. Cl.
CPC ....... *H04W 52/0235* (2013.01); *H04B 7/0413* (2013.01); *H04W 76/28* (2018.02)

(58) Field of Classification Search
CPC . H04W 52/0235; H04W 76/28; H04B 7/0413
USPC ............ 455/574, 418, 423, 414.1, 422.1
See application file for complete search history.

(56) References Cited

U.S. PATENT DOCUMENTS

| | | | |
|---|---|---|---|
| 2001/0020915 A1* | 9/2001 | Proctor, Jr. | H01Q 3/2605 342/372 |
| 2012/0224521 A1 | 9/2012 | Zhu et al. | |
| 2013/0010664 A1 | 1/2013 | Kang et al. | |
| 2018/0145800 A1 | 5/2018 | Srivastav et al. | |
| 2019/0149380 A1* | 5/2019 | Babaei | H04W 72/23 370/330 |
| 2019/0254110 A1 | 8/2019 | He et al. | |
| 2019/0297577 A1* | 9/2019 | Lin | H04W 52/0235 |

(Continued)

FOREIGN PATENT DOCUMENTS

| | | |
|---|---|---|
| CN | 107306442 A | 10/2017 |
| CN | 109496452 A | 3/2019 |

(Continued)

OTHER PUBLICATIONS

European Search Report for EP Patent Application No. 19942344.3, dated Jun. 30, 2022, 12 pages.

(Continued)

*Primary Examiner* — Nghi H Ly
(74) *Attorney, Agent, or Firm* — Perkins Coie LLP

(57) ABSTRACT

Methods, systems, and devices for power saving schemes in wireless communication are described. A wireless communication method is provided to comprise monitoring, by a user device, power saving indications transmitted from a network device during corresponding monitoring occasions predefined or configured by a higher layer parameter, the power saving indications including a first typed power saving indication or a second typed power saving indication; and performing a next action based on a predefined condition.

20 Claims, 15 Drawing Sheets

(56) References Cited

U.S. PATENT DOCUMENTS

2020/0029316 A1* 1/2020 Zhou ................. H04W 74/0833
2021/0377864 A1 12/2021 Li

FOREIGN PATENT DOCUMENTS

EP 3079421 A1 10/2016
WO 2019/063336 A1 4/2019

OTHER PUBLICATIONS

Chinese office action issued in CN Patent Application No. 201980101394.0, dated Jul. 12, 2023, 8 pages. English translation included.
Canadian office action issued in CA Patent Application No. 3,151,522, dated Mar. 31, 2023, 4 pages.
Canadian office action issued in CA Patent Application No. 3,151,522, dated Jan. 16, 2024, 4 pages.
International Preliminary Report on Patentability issued in International Patent Application No. PCT/CN2019/101017, dated Feb. 17, 2022, 5 pages.
International Search Report and Written Opinion mailed on May 18, 2020 for International Application No. PCT/CN2019/101017, filed on Aug. 16, 2019 (7 pages).
Catt, "PDCCH-Based Power Saving Signal/Channel Design", 3GPP TSG RAN WG1 Meeting #97, Reno, USA, R1-1906350, 14 pages, May 13-17, 2019.
European Communication pursuant to Article 94(3) EPC issued in EP Patent Application No. 19942344.3, dated Apr. 16, 2024, 4 pages.
Chinese office action issued in CN Patent Application No. 201980101394.0, dated Apr. 28, 2024, 5 pages. English translation included.

* cited by examiner

910: Monitoring, by a user device, power saving indications transmitted from a network device during corresponding monitoring occasions predefined or configured by a higher layer parameter, the power saving indications including a first typed power saving indication or a second typed power saving indication

920: Performing a next action based on a predefined condition

FIG. 9

POWER SAVING SCHEMES IN WIRELESS COMMUNICATION

CROSS-REFERENCE TO RELATED APPLICATIONS

This application is a continuation of International Patent Application No. PCT/CN2019/101017, filed on Aug. 16, 2019, the contents of which are incorporated herein by reference in their entirety.

TECHNICAL FIELD

This patent document generally relates to systems, devices, and techniques for wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices.

SUMMARY

This document relates to methods, systems, and devices for power saving schemes in wireless communications.

In one aspect, a wireless communication method is disclosed. The method includes monitoring, by a user device, power saving indications transmitted from a network device during corresponding monitoring occasions predefined or configured by a higher layer parameter, the power saving indications including a first typed power saving indication or a second typed power saving indication; and performing a next action based on a predefined condition.

In another aspect, a wireless communication method is disclosed. The method includes configuring, by a network device, one or more power saving indications, each power saving indication having a first typed power saving indication or a second typed power saving indication; and transmitting, by the network device, to a user device, the one or more power saving indications at different timings based on a type of the power saving indication.

In another aspect, a wireless communication apparatus comprising a processor configured to perform the disclosed methods is disclosed.

In another aspect, a computer readable medium having code stored thereon is disclosed. The code, when implemented by a processor, causes the processor to implement a method described in the present document.

The above and other aspects and their implementations are described in greater detail in the drawings, the descriptions, and the claims.

BRIEF DESCRIPTION OF THE DRAWINGS

FIGS. 9 and 10 show examples of wireless communication schemes based on some implementations of the disclosed technology.

DETAILED DESCRIPTION

The disclosed technology provides implementations and examples of power saving techniques. In some implementations, the power saving techniques proposed in this document provide methods for monitoring and receiving control information, which can be used in a New Radio Access Technology (NR) communication system.

Currently, for a DRX (Discontinuous Reception) configuration, a network device needs to send a Downlink Control Information (DCI) to the UE before the DRX-On duration, indicating whether the UE needs to listen to the PDCCH (Physical Downlink Control Channel) in the subsequent one or more DRX-On durations. In this manner, the UE can reduce some unnecessary PDCCH monitoring operations and achieve power saving. On the other hand, for a case that the DRX configuration is not configured, the UE needs to monitor the downlink control information in the PDCCH monitoring occasions. In this case, some downlink control information includes a power saving information to trigger the UE to perform the power saving operation to achieve the power saving.

Figure 3A:
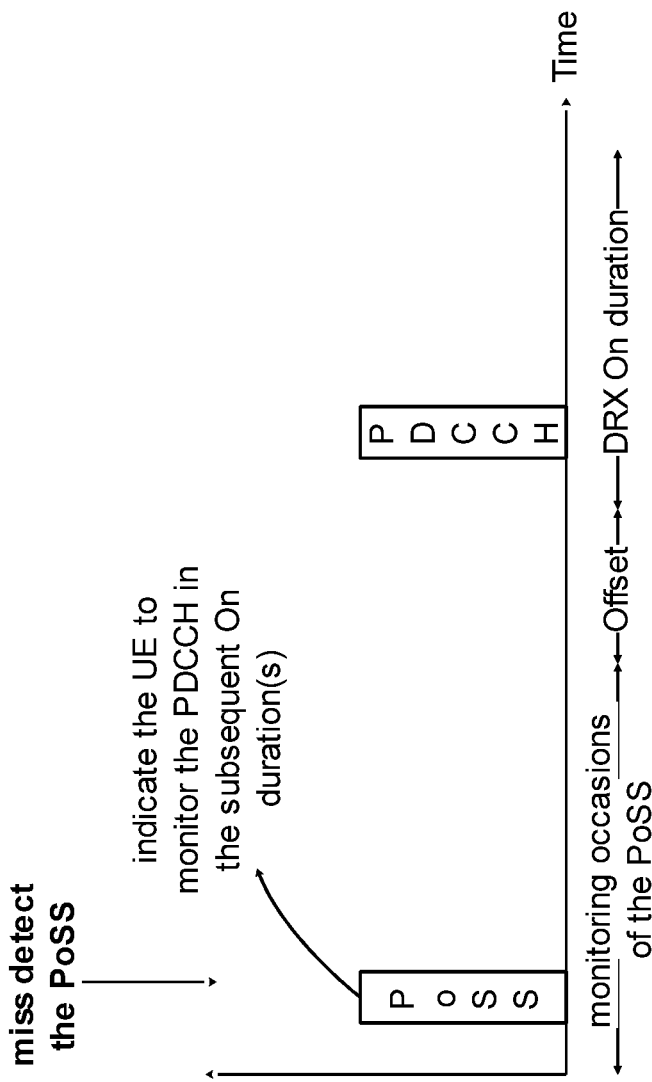
FIG. 3A shows an example of a missed detection of a PoSS (power saving signal/channel) during outside Active Time with DRX (Discontinuous Reception) configuration.
Figure 3B:
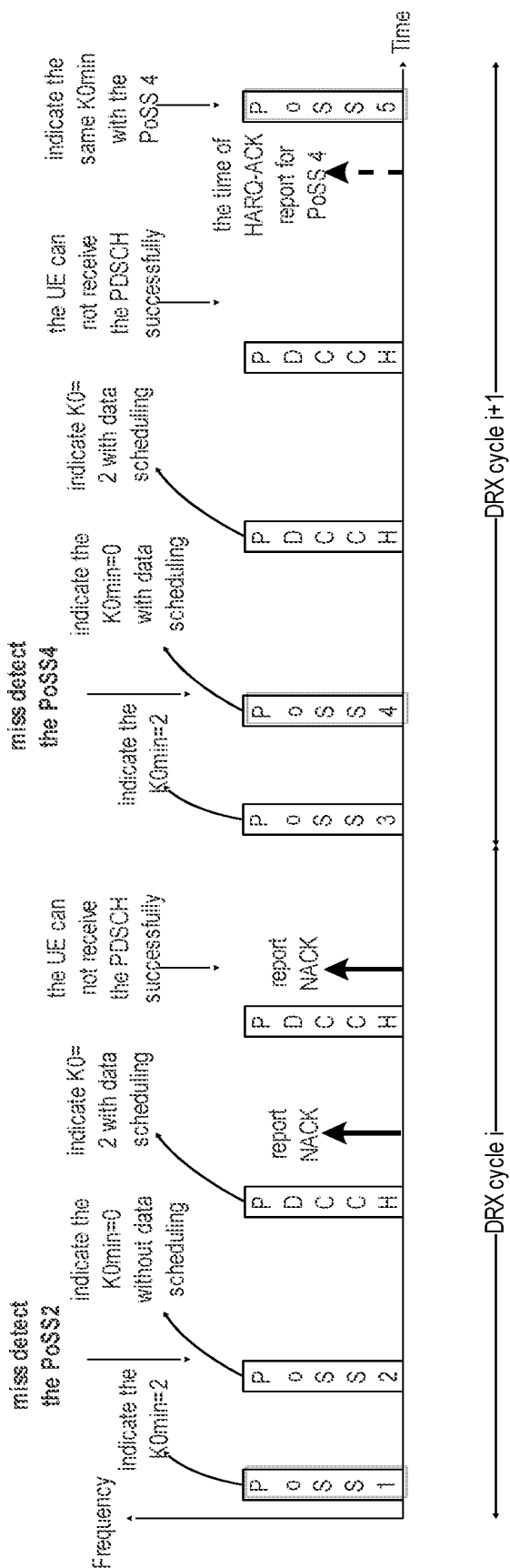
FIG. 3B shows an example of a missed detection of a PoSS during Active Time with DRX configuration.

In the communication systems, there are some designs adopted to achieve power savings in configuring DRX. For example, the system is designed such that the UE doesn't need to perform CSI reporting during the DRX-Off period, and the UE can only do CSI-RS-Resource-Mobility when the DRX cycle is greater than 80 ms. In another example, the UE only needs to monitor a limited number of RNTI scrambled PDCCHs such as P-RNTI/RA-RNTI/TC-RNTI during DRX-Off period. The power saving signal monitored by the UE before the DRX-On duration includes a field indicating the mode of the UE, e.g., either a waking up mode or a sleeping mode. If the power saving signal is missed outside Active Time, which indicates the UE to monitor PDCCH in the subsequent On duration, the UE will remain in the non-waking up mode and thus the UE shall miss all PDSCHs in the subsequent DRX Active Time. FIG. 3A shows an example in which the power saving signal/channel, PoSS, which is transmitted outside Active Time and indicates the UE to monitor the PDCCH in the subsequent On duration is missed. In this case, the operations of data scheduling and CSI reporting causes several issues including the increase of the system delay, the decrease of the link quality of subsequent data transmission, and negative impacts on user experiences. Therefore, the UE is designed to have high performance requirements for monitoring such signals. On the other hand, the UE monitors the DCI indicating the power saving scheme in the DRX-On duration, and the indicated power saving scheme is k0/k1/k2/ aperiodic CSI-RS trigger offset (A-CSI-RS trigger Offset)/ aperiodic SRS(A-SRS) trigger offset. If the UE fails to detect the power saving signal/channel with minimum K0 indication, the UE side and the gNB side will have inconsistent understanding on time domain scheduling resources, which results in poor data transmissions and causes a severe delay. FIG. 3B shows an example in which the power saving signals/channels, PoSS2 and PoSS4, which are transmitted within the Active Time is missed during the DRX cycle i and the DRX cycle i+1. According to the above analysis, if some measures to avoid missed detection or missed detection are taken, the stability of the system will be greatly reduced.

This document proposes various detection mechanisms using a type of power saving indication information, which can effectively reduce the inconsistency between the UE and the network device. The proposed techniques can avoid missing a detection of a power saving indication and improve UE's ability to monitor a power saving signal.

Figure 1:
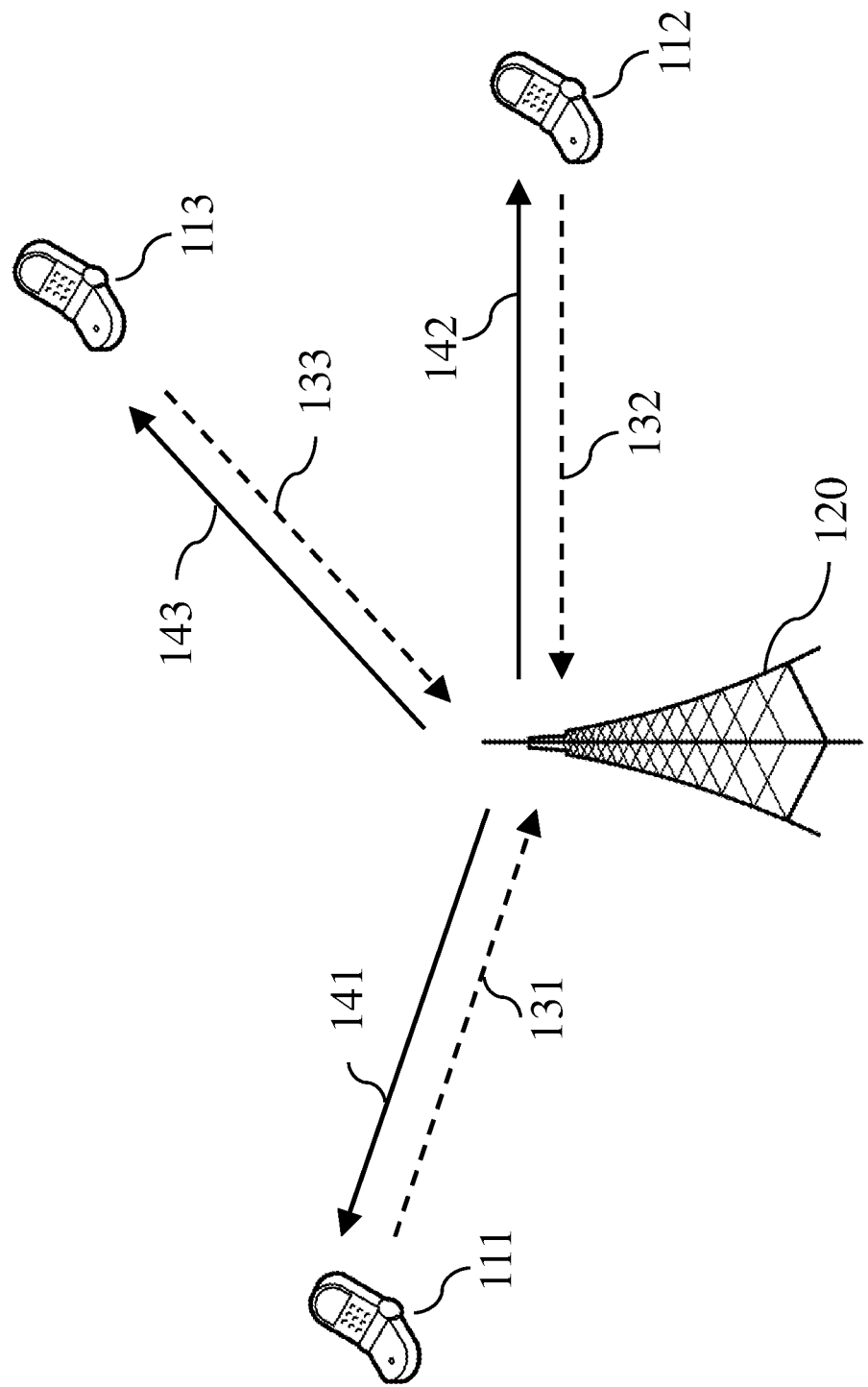
FIG. 1 shows an example of a base station (BS) and user equipment (UE) in wireless communication based on some implementations of the disclosed technology.

FIG. 1 shows an example of a wireless communication system (e.g., a 5G or NR cellular network) that includes a BS 120 and one or more user equipment (UE) 111, 112 and 113. In some embodiments, the UEs access the BS (e.g., the network) using implementations of the disclosed technology (131, 132, 133), which then enables subsequent communication (141, 142, 143) from the BS to the UEs. The UE may be, for example, a smartphone, a tablet, a mobile computer, a machine to machine (M2M) device, an Internet of Things (IoT) device, and so on.

Figure 2:
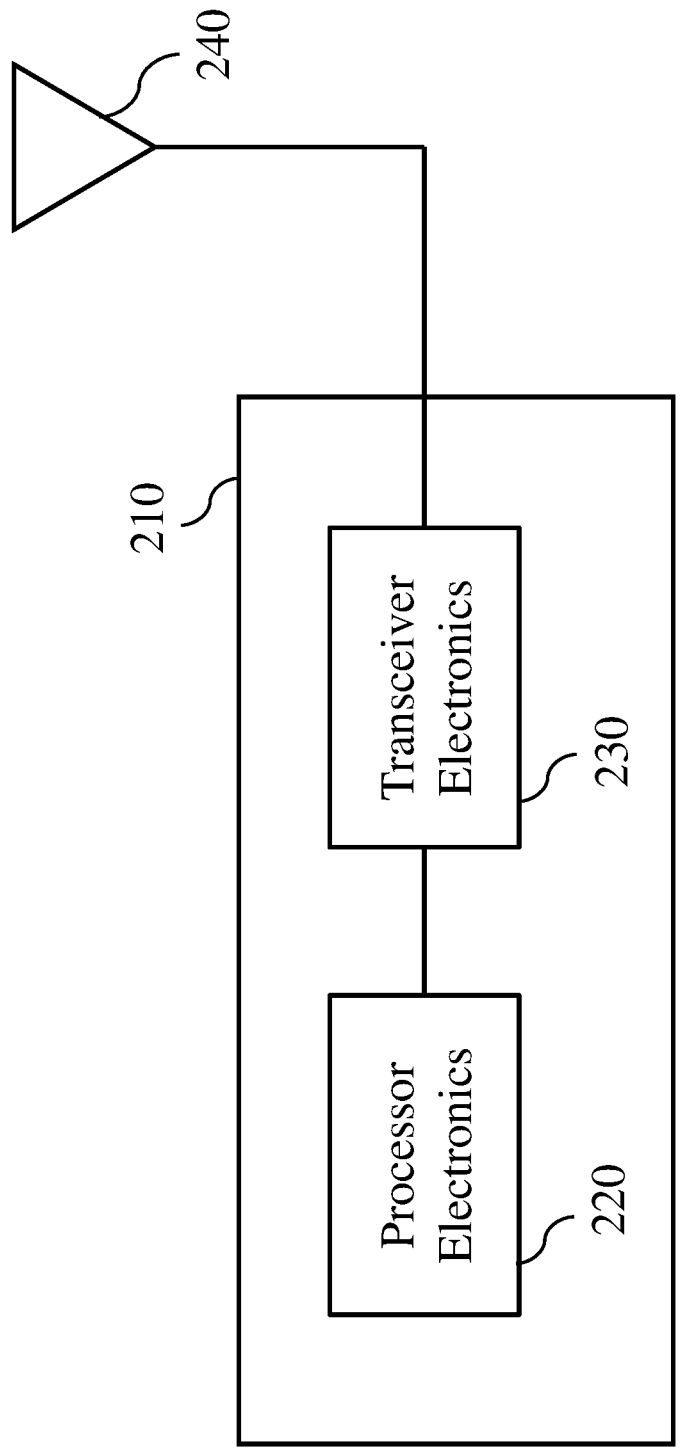
FIG. 2 shows an example of a block diagram of a portion of an apparatus based on some implementations of the disclosed technology.

FIG. 2 shows an example of a block diagram representation of a portion of an apparatus. An apparatus 210 such as a base station or a wireless device (or UE) can include processor electronics 220 such as a microprocessor that implements one or more of the techniques presented in this document. The apparatus 210 can include transceiver electronics 230 to send and/or receive wireless signals over one or more communication interfaces such as antenna 240. The apparatus 210 can include other communication interfaces for transmitting and receiving data. The apparatus 210 can include one or more memories (not explicitly shown) configured to store information such as data and/or instructions. In some implementations, the processor electronics 220 can include at least a portion of transceiver electronics 230. In some embodiments, at least some of the disclosed techniques, modules or functions are implemented using the apparatus 210.

As discussed above, in the wireless communication system, the UE monitors the PDCCH to obtain the DCI (downlink control information), in order to ensure that the UE can successfully receive the PDCCH and avoid the inconsistency with the gNB caused due to the missed detection of the PDCCH by the UE.

Figure 4A:
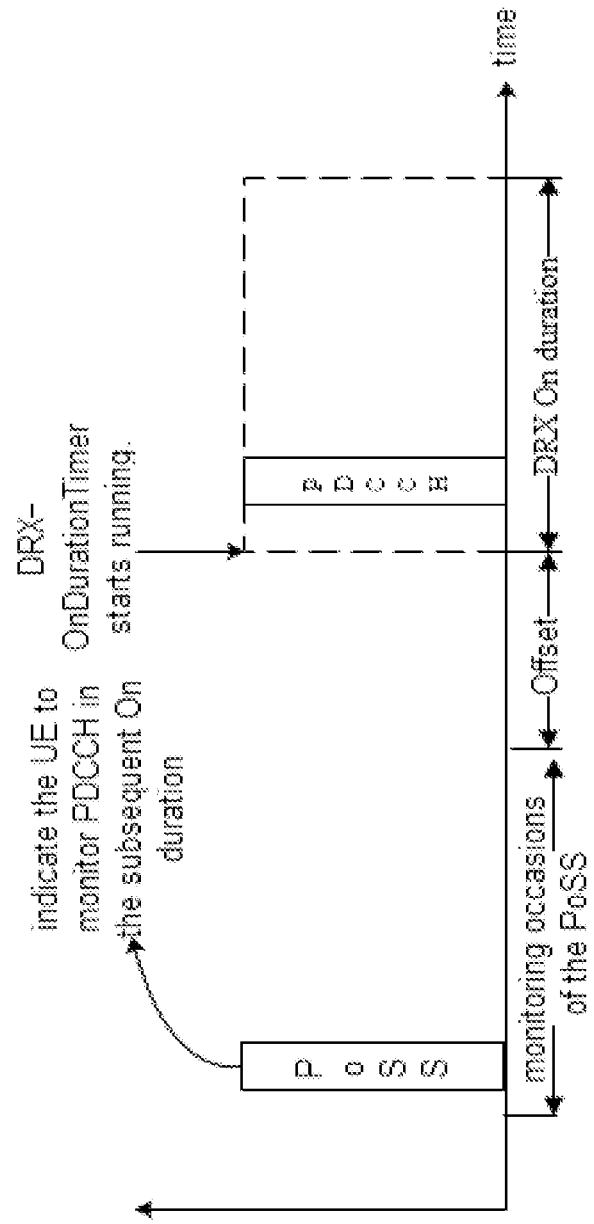
FIG. 4A shows an example of a power saving signal monitoring process during outside Active Time with DRX configuration based on some implementations of the disclosed technology.

The power saving signals/channels (hereinafter, 'PoSS') are divided into two types according to the time domain:

1) The UE monitors the PoSS at the outside Active Time and before the offset time of the DRX On duration starting position. FIG. 4A shows that the PoSS transmitted from the network device is received during a monitoring occasion of the PoSS which is outside Active Time and before the offset time. The value of the offset is configured by the high-layer signaling. The PoSS at least triggers the UE to monitor or not to monitor the PDCCH in the subsequent one or more DRX On durations.

Figure 4B:
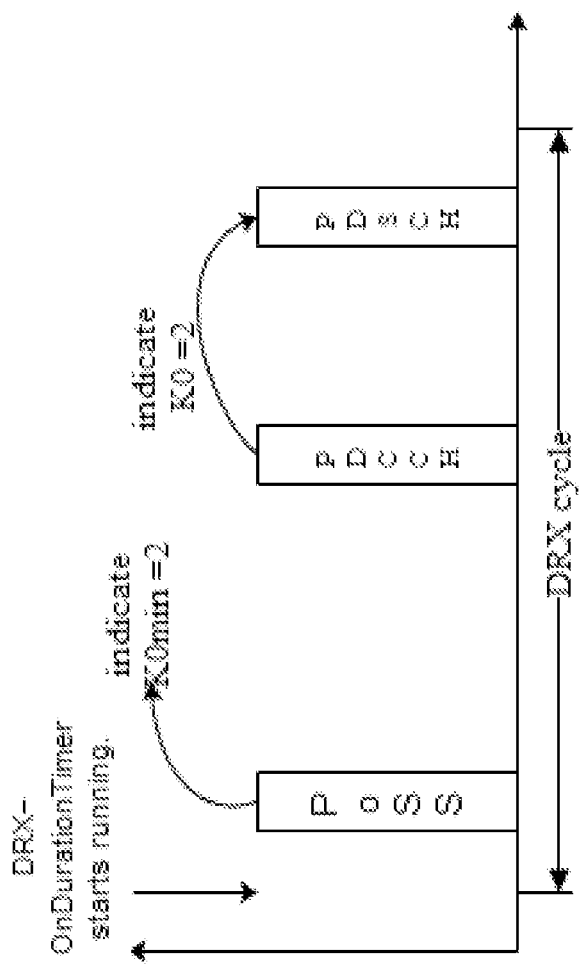
FIG. 4B shows an example of a power saving signal monitoring process during Active Time with DRX configuration based on some implementations of the disclosed technology.

2) The UE detects the PoSS within the Active Time, which is generally an enhanced existing DCI format (e.g. format 0_0/0_1/1_0/1_1/2_0/2_1/2_2) in the Rel-15. The PoSS within the Active Time can at least indicate the minimum K0/K1/K2/A-CSI-RS trigger offset/A-SRS trigger offset. The PoSS is transmitted by the enhanced the existing DCI format with reproposing some fields of the existing DCI format or add some additional fields in the existing DCI format. FIG. 4B shows that the PoSS is received during the DRX cycle after the DRX-OnDurationTimer starts running.

The PoSS at least outside the Active Time is scrambled by the PS-RNTI, and the PoSS in the Active Time can be scrambled by RNIT such as PS-RNTI/C-RNTI/MCS-C-RNTI and others. The power saving signal/channel in the Active Time may be an enhancement of DCI format 0_0/ 0_1/1_0/1_1/2_0/2_1/2_2/2_3 in Rel-15. The PoSS in outside Active Time and in Active Time can also be or include a new DCI format. The PoSS outside the Active Time can indicate one or more UEs to perform the power saving techniques. The PoSS in the Active Time can indicate one UE to perform the power saving techniques. In some implementations, the power saving techniques indicated by the PoSS in Active Time triggers the UE with fixed bit width when some of the fields with a predefined trigger state, e.g. all '0's, or all '1's, or configured by higher layer parameters. In some implementations, the power saving techniques in Active Time indicated by the PoSS triggers the UE with a fixed bit width by adding a number of fields in the existing DCI formats.

In some implementations, the monitoring occasions of the PoSS in the outside Active Time are determined by at least one of the search space, CORESET, or the offset value configured by higher layer parameters. In some implementations, the offset is configured by the search space and CORESET of the PoSS. In some implementations, the search spaces of the PoSS in the outside Active Time are dedicated or different from that of the Active Time. The CORESETs of the PoSS in the outside Active Time are dedicated or different from that of the Active Time. In some implementations, the number of search space and the number of CORESET are both an integer and larger than 1. In some implementations, the number of CORESET is equal to 1. In some implementations, the length or duration of monitoring occasions of the PoSS in the outside Active Time is limited or configured by the higher layer parameters.

In some implementations, the monitoring occasions of the PoSS in Active Time is determined by the search space and the CORESET configured by the higher layer parameters. In some implementations, the configuration of search space and CORESET of the PoSS in Active Time is the same as that of the existing DCI formats in Active Time. In some implementations, the number of configurable search space and CORESET of the PoSS in Active Time is the same as that of the existing DCI formats in Active Time.

The power saving techniques proposed in this patent document can include at least one of the followings:

1) indication triggering the UE to monitor or not to monitor PDCCH in the subsequent On duration(s), 2) minimum value of K0/K1/K2/A-CSI-RS trigger offset/ A-SRS trigger offset,
3) BWP ID indication,
4) the maximum number of MIMO layer,
5) SCell activation/deactivation,
6) SCell dormant state activation/deactivation,
7) CSI report,
8) skip PDCCH monitoring, or
9) PDCCH monitoring periodicity switching, and others.

In some implementations, the power saving signal outside the Active Time can also indicate the information of disabling or enabling the indication of the minimum K0/K1/K2/A-CSI-RS trigger offset/A-SRS trigger offset, or the maximum MIMO layer, or others.

In some implementations, an aperiodic CSI-RS offset may include a slot offset between a triggering downlink control information and an aperiodic non zero power channel state information reference signal (NZP CSI-RS) resources set. In some implementations, aperiodic SRS offset may include an offset in number of slots between the triggering DCI and the actual transmission of this SRS-ResourceSet. In some implementations, K0 may include an offset between DCI and its scheduled PDSCH. In some implementations, K2 may include a slot offset between DCI and its scheduled PUSCH. In some implementations, K1 may include a slot offset between PDSCH and the DL ACK or slot offset between DCI and HARQ.

This patent document provides techniques for monitoring and receiving control information, which can be used in a New Radio Access Technology (NR) communication system. The techniques/methods proposed in this document may be used in a 5G mobile communication system or other wireless/wired communication system. In some implementations, the base station may transmit data (downlink transmission service data) to mobile users or send data (uplink transmission service data) to the base station from the mobile users. Mobile users may include: mobile devices as access terminals, user terminals, subscriber stations, subscriber units, mobile stations, remote stations, remote terminals, user agents, user devices, user equipment, or some other terminology. The base station may include an access point (AP), or may be called a node B, a radio network controller (RNC), an evolved Node B (eNB), and a Base Station Controller (BSC), Base Transceiver Station (BTS), Base Station (BS), Transceiver Function (TF), Radio Router, Radio Transceiver, Basic Service Unit, Extension Service unit, Radio Base Station (RBS), or some other terminology.

The proposed techniques can be applied to an enhanced mobile broadband (eMBB) scenario and an ultra-reliable low-latency communication in the new radio access technology NR (Ultra-Reliable and Low Latency Communications (URLLC) scenario or Massive Machine Type Communications (MMTC) scenario.

Section headings are used in the present document only to facilitate ease of understanding and scope of the embodiments and techniques described in each section are not only limited to that section. Furthermore, while 5G terminology is used in some cases to facilitate understanding of the disclosed techniques, which may be applied to wireless systems and devices that use communication protocols other than 5G or 3GPP protocols.

In some implementations, the 'Active Time' represents the Active Time defined in the MAC layer, for example, when a DRX cycle is configured, the Active Time includes the time while: 1) drx-onDurationTimer or drx-Inactivity-Timer or drx-RetransmissionTimerDL or drx-RetransmissionTimerUL or ra-ContentionResolutionTimer is running; or 2) a Scheduling Request is sent on PUCCH and is pending; or 3) a PDCCH indicating a new transmission addressed to the C-RNTI of the MAC entity has not been received after successful reception of a Random Access Response for the Random Access Preamble not selected by the MAC entity among the contention-based Random Access Preamble. In some implementations, the Active Time represents the duration that the UE is required to monitor the PDCCH scrambled by C-RNTI, CS-RNTI, INT-RNTI, SFI-RNTI, SP-CSI-RNTI, TPC-PUCCH-RNTI, TPC-PUSCH-RNTI, and TPC-SRS-RNTI. In some implementations, the Active Time represents the PDCCH monitoring occasions in DRX Active Time. In some implementations, the Active Time represents the monitoring occasions of the PoSS by enhancing the existing DCI format 0_1/1_1. In some implementations, the Active Time represents the monitoring occasions of the DCI format 0_0/0_1/1_0/1_1. In some implementations, the Active Time represents the non-outside Active Time in a DRX cycle.

In some implementations, the 'outside Active Time' represents the period which is not the Active Time defined in the MAC layer. In some implementations, the outside Active Time represents the duration that the UE dose not required to monitor the PDCCH scrambled scrambled by C-RNTI, CS-RNTI, INT-RNTI, SFI-RNTI, SP-CSI-RNTI, TPC-PUCCH-RNTI, TPC-PUSCH-RNTI, and TPC-SRS-RNTI. In some implementations, the outside Active Time represents the non-monitoring occasions of the DCI format 0_0/0_1/1_0/1_1/2_0/2_1/2_2/2_3. In some implementations, the outside Active Time represents the DRX-Off duration. In some implementations, the outside Active Time represents the monitoring occasions of the PoSS configured by the higher layer parameters before the DRX On duration.

Some implementations of the disclosed technology propose re-purposing the existing DCI to convey power saving information to a single UE in the Active Time.

Embodiment 0

In some implementations, the PoSS is transmitted by PDCCH. In some implementations, the PoSS is a DCI. In some implementations, the PoSS is a power saving signaling. In some implementations, PoSS is also noted as power saving indication.

In some implementations, the PoSS indicating the power saving techniques in Active Time has a power saving identifier field to identify whether the DCI indicates the power saving techniques. In some implementations, the PoSS is an enhanced existing DCI format 0_0/0_1/1_0/1_1 with a predefined certain number of special fields to identify whether the DCI indicates the power saving techniques. In some implementations, the predefined certain number of special fields in the enhanced existing DCI format 0_0/0_1/1_0/1_1 are set to all '0's or all '1's separately. In some implementations, the predefined certain number of special fields includes special fields to activate the DL SPS release. In some implementations, the PoSS is an enhanced existing DCI format 0_0/0_1/1_0/1_1 scrambled with an extent value of C-RNTI to identify whether the DCI indicates the power saving techniques. In some implementations, the PoSS is an enhanced existing DCI format 0_0/0_1/1_0/1_1 scrambled with a PS-RNTI. In some implementations, the PoSS is an enhanced existing DCI format 0_0/0_1/1_0/1_1 with an additional field to identify whether the DCI indicates the power saving techniques. In some implementations, the PoSS is an enhanced existing DCI format 0_0/0_1/1_0/1_1 with some additional fields or repurposed existing fields to identify whether the DCI indicates the power saving techniques or indicate power saving techniques and the UE shall ignore the other fields.

In some implementations, the PoSS in Active Time may not schedule the PDSCH or not indicate a valid PDSCH. In some implementations, the UE ignores the PDSCH scheduling information indicated by the PoSS in Active Time. In some implementations, the PoSS in Active Time schedules the PDSCH. In some implementations, the UE receives the PDSCH scheduled by the PoSS in Active Time.

In some implementations, if the PoSS is an enhanced existing DCI format 0_0, the additional field to indicate the power saving techniques or to identify whether the DCI indicates the power saving techniques should be added before the UL/SUL indicator field. In some implementations, if the PoSS is an enhanced existing DCI format 0_0, the additional field to indicate the power saving techniques or to identify whether the DCI indicates the power saving techniques should be added before the padding bits if required. In some implementations, if the PoSS is an enhanced existing DCI format 0_0, the repurposed field to indicate the power saving techniques or to identify whether the DCI indicates the power saving techniques should not be the UL/SUL indicator field. In some implementations, if the PoSS is an enhanced existing DCI format 0_0, the repurposed field to indicate the power saving techniques or to identify whether the DCI indicates the power saving techniques should be the fields before the padding bits. In some implementations, the fields for transport block 2 of DCI format 1_1 are repurposed to indicate power saving techniques in Active Time when the higher layer parameter maxNrofCodeWordsScheduledByDCI is not equal to 2.

In some implementations, if the PoSS is an enhanced existing DCI format 0_0, the additional field to indicate the power saving techniques or to identify whether the DCI indicates the power saving techniques should be added below the padding bits if required. In some implementations, the budget size of the PoSS in Active Time should be truncated or added padding bits to align with the size of the DCI format 0_0/0_1/1_0/1_1. In some implementations, the budget size of the PoSS outside Active Time should be truncated or added padding bits to align with the size of the DCI format 0_0/0_1.

For example, if the power saving techniques within the Active Time are indicated by re-purposing the existing fields the fall-back DCI, the two cases need to be considered. On one hand, the power saving signal indicates both power saving techniques and PDSCH scheduling information. The power saving techniques may only be indicated when there is a PDSCH needs to be scheduled by the PDCCH, so the scheduling flexibility might be limited. For example, if the cross-slot scheduling indication has been indicated by the most recent PoSS, and there are large data to be transmitted by the gNB, it might be difficult to timely indicate the same-slot scheduling information by the PoSS with data scheduling. Therefore, on the other hand, if the PoSS indicating the cross-slot scheduling is not required to indicate the PDSCH scheduling information, the cross-slot scheduling information can be indicated by the PoSS to reduce the power consumption of PDCCH-Only monitoring operation during the inactivity scheduling situation.

The PoSS within the Active Time scheduling PDSCH may result in the limited scheduling flexibility of the power saving techniques. In reverse, the PoSS without PDSCH scheduling in the Active Time can bring more power saving gain due to the preferable scheduling flexibility.

In NR Rel-15, the PDCCH validation for DL SPS is implemented by predefining values of some special fields. Therefore, the PoSS within the Active Time can also set some fields to all '0's, or all '1's. For example, the DCI format 1_1 is used to indicate the power saving techniques. If the DCI format 1_1 is scrambled by the C-RNTI, and the modulation and coding scheme and the new data indicator field and the redundancy version are set as shown in Table 1, the fields for transport block 2 are repurposed to indicated power saving techniques when the higher layer parameter maxNrofCodeWordsScheduledByDCI is not equal to 2.

TABLE 1

Special fields for indicating the power saving techniques within Active Time

| The fields for transport block 1 | DCI format 1_1 |
|---|---|
| modulation and coding scheme | set to all '1's |
| new data indicator field | set to '0' |
| Redundancy version | For the enabled transport block: set to '00' |
| HARQ process number | set to all '1's |
| Time domain resource assignment | set to all '0's of 4 bits |

The fields of transport block 1 in DCI format 1_1 is proposed to be the special fields identifying the indication of the power saving techniques within Active Time.

In some implementations, the PoSS consists of a first typed PoSS and a second typed PoSS. The first typed PoSS refers to the PoSS transmitted in the outside Active Time. The second typed PoSS refers to the PoSS transmitted in the Active Time. In some implementations, for both outside Active Time and Active Time, 1) the feedback of the PoSS, if needed, shall be reported after the monitoring occasions end, or 2) the feedback of the PoSS is reported after the drx-OnDuration timer starts, or 3) the feedback of the PoSS outside Active Time is reported during the feed-back timer running, and is completed before the feed-back timer expired. In some implementations, the feedback timer is configured by RRC signaling.

In some implementations, the high layer signaling indicates the position information of the potential power saving techniques indicated by the PoSS, such as a starting position and the bit length of the power saving technique field, or a bit map of each power saving scheme, or the position of the triggering state ID.

The following scheduling DCI refers to at least a DCI with data scheduling information, or DCI format0_0/0_1/1_0/1_1 indicating UL/DL scheduling information.

Embodiment 1

During the outside Active Time, the UE monitors the PoSS in the monitoring occasions configured by the higher layer parameters. If the UE does not detect the PoSS during the monitoring occasions, at least one of the following operations can be performed. Indication information included in the PoSS may be predefined or configured by the higher layer parameters from gNB and thus the UE can know such information even when the UE does not detect the PoSS.

In some implementations, if the PoSS can trigger the UE to monitor or not to monitor PDCCH in the subsequent one or more On durations, the UE shall assume that the PoSS indicates the UE to monitor PDCCH in the subsequent one or more DRX-On durations. In some implementations, the UE shall monitor PDCCH in the subsequent fixed period. In some implementations, the UE shall monitor PDCCH during the default timer running and not monitor PDCCH when the default timer has expired.

In some implementations, if the PoSS can indicate the maximum MIMO layer, the UE assumes that 1) the maximum MIMO layer is a fixed value applied for the subsequent fixed duration; or 2) the maximum MIMO layer is a fixed value during the default timer running and fall backs to the default value after the default timer expired; or 3) the maximum MIMO layer is the larger one between the default value and the MIMO layer indicated by the PDCCH in the Active Time; or 4) the maximum MIMO layer is the default value until the new maximum MIMO layer is indicated by the PDCCH or configured by the higher layer parameters. In some implementations, the default value is the MIMO layer indicated by the higher layer parameter in UEAssistanceInformation reported by the UE.

In some implementations, the default value or the fixed value are the maximum MIMO layer configured by the higher layer parameter for the serving cell or the BWP. In some implementations, the fixed value is a value selected from the set {2, 4, 8}. The fixed values of UL and DL are different. In some implementations, the fixed value is equal to 4 for UL and 8 for DL. In some implementations, the fixed value is the same as the default value.

The following indicates the filed indicating the MIMO layer value in the RRC signaling UEAssistanceInformation in TS 38.331.

```
reducedMaxMIMO-LayersFR1        SEQUENCE {
    reducedMIMO-LayersFR1-DL        MIMO-LayersDL,
    reducedMIMO-LayersFR1-UL        MIMO-LayersUL
} OPTIONAL,
reducedMaxMIMO-LayersFR2        SEQUENCE {
    reducedMIMO-LayersFR2-DL        MIMO-LayersDL,
    reducedMIMO-LayersFR2-UL        MIMO-LayersUL
} OPTIONAL
```

In some implementations, if the PoSS can indicate a minimum k0/k1/k2/A-CSI-RS trigger offset/A-SRS trigger, the UE assumes that 1) the minimum k0/k1/k2/A-CSI-RS trigger offset/A-SRS trigger offset is a fixed value for the subsequent fixed duration, or 2) the minimum k0/k1/k2/A-CSI-RS trigger offset/A-SRS trigger offset is a fixed value during the default timer running, and falls back to the default value after the default timer expired; or 3) the minimum k0/k1/k2/A-CSI-RS trigger offset/A-SRS trigger offset is the smaller one between the default value and the k0/k1/k2/A-CSI-RS trigger offset/A-SRS trigger offset indicated by the PDCCH in Active Time; or 4) the minimum k0/k1/k2/A-CSI-RS trigger offset/A-SRS trigger offset is the default value until the PoSS indicates a new minimum k0/k1/k2/A-CSI-RS trigger offset/A-SRS trigger offset in Active Time. In some implementations, the default value is 0. In some implementations, the default value is the minimum value configured by the higher layer parameters. In some implementations, the fixed value is 0. In some implementations, the fixed value is the same as the default value.

In some implementations, if the PoSS indicates the BWP ID information, the UE assumes that 1) the BWP ID is one of the default BWP or the initial BWP; or 2) the BWP ID is the current BWP; or 3) the BWP ID is a dedicated BWP ID and the UE switches to the dedicated BWP for the subsequent duration; or 4) the UE switches to the dedicated BWP with a default timer starting running and falls back to the current BWP until a default timer expired. In some implementations, the dedicated BWP is the BWP only for the PoSS transmission.

In some implementations, if PoSS indicates the SCell dormant state activation/deactivation, the UE shall assume that 1) the SCell dormant state is activated if the current SCell is not the dormant state; or 2) the SCell dormant state is deactivated if the current SCell is the dormant state; or 3) the SCell keeps a fixed state until the another SCell state indicated by the PDCCH or higher layer parameters. In some implementations, the UE performs the behavior of 1) or 2) for the SCell for a fixed duration, or keeps the state from the default timer starting running and falls back to the deactivated state of the SCell after the default timer expired.

In some implementations, if the PoSS indicates the SCell activation/deactivation, the UE assumes that the UE assumes that 1) the SCell is activated if the current SCell is in a deactivated state; or 2) the UE assumes that the SCell is deactivated if the current SCell is in an activated state; or 3) the SCell is activated until a subsequent signaling indicates the SCell is deactivated. In some implementations, the UE performs the behavior of 1) or 2) for the SCell for a fixed duration, or keeps the state from the default timer starting running and falls back to the deactivated state of the SCell after the default timer expired.

In some implementations, the fixed duration or the default timer is configured by higher layer parameters or a predefined configuration, and the unit is ms. In some implementations, the optional value of the fixed duration may be an any value in the set of {1, 2, 3, 4, 5, 6, 8, 10, 20, 30, 40, 50, 60, 80, 100, 200, 300, 400, 500, 600, 800, 1000, 1200, 1600} or ($\alpha 1^{\beta 1} * \alpha 2^{\beta 2} * \alpha 3^{\beta 3}$), where $\alpha 1$, $\alpha 2$ and $\alpha 3$ are any values in the set {1, 2, 3, 5}, and $\beta 1$, $\beta 2$ and $\beta 3$ are natural numbers less than 5. In some implementations, the fixed duration or the default timer is not larger than the DRX On duration Timer. In some implementations, the position information of the fixed duration is configured by the higher layer parameters.

In some implementations, the UE starts to apply the above values or default behaviors to the next slot. In some implementations, the UE starts to apply the above values or default behaviors based on the slot ID according to the position information of the fixed duration.

In some implementations, the PoSS is only transmitted to instruct the UE not to monitor the PDCCH. If the UE does not detect the PoSS within the monitoring occasions of the PoSS, the UE assumes the power saving signal/the channel indicates the UE to monitor PDCCH. In some implementations, before performing the foregoing operations, the UE has a fixed preparation time, where the preparation time is configured by a predefined configuration or higher layer parameters.

In some implementations, after performing the foregoing operations, the parameter value is valid only for a period of default duration. After the time period, the UE performs the other trigger state of the power saving techniques, or schedules the value indicated by the DCI. The default duration is $T_{default}$, and $0 \leq T_{default} \leq T_{drx-Onduration}$, and the unit is ms.

For example, the UE monitors the PoSS in the monitoring occasions outside Active Time, and the PoSS can indicate the UE to monitor or not to monitor PDCCH in the subsequent DRX On duration and the BWP ID information. If the UE does not detect the PoSS during the monitoring occasions, the UE performs PDCCH monitoring in the subsequent DRX On duration in the current BWP.

Figure 5A:
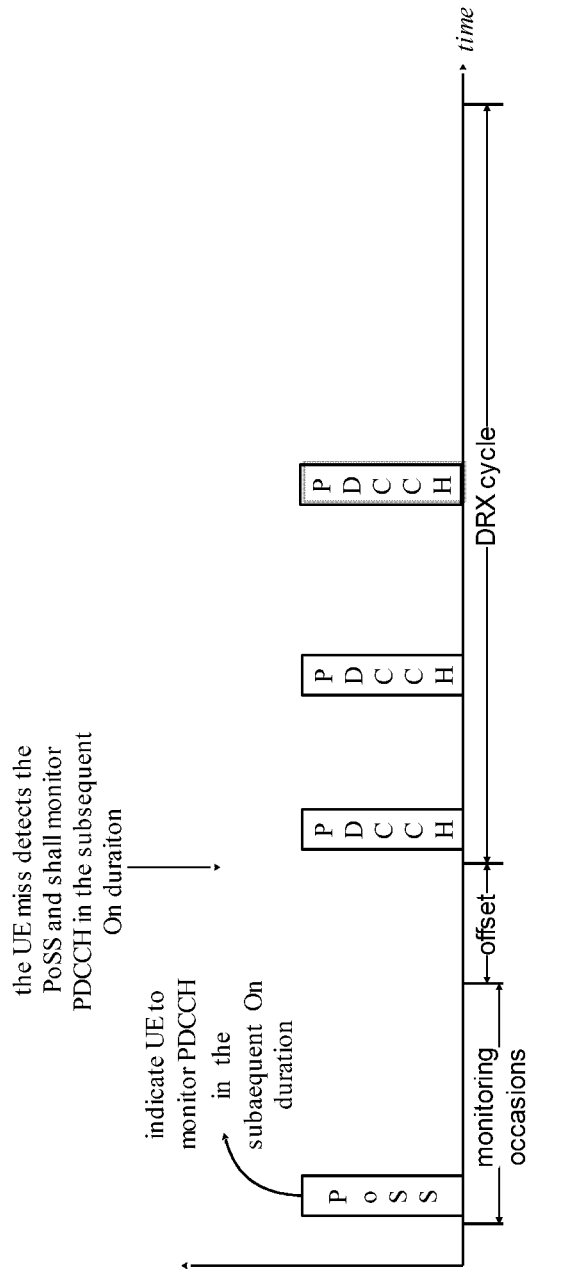
FIGS. 5A and 5B shows examples of a diagram showing a default behavior for the missed detection of a power saving signal.

For example, the UE monitors the PoSS in the monitoring occasions outside Active Time, and the UE knows that the PoSS indicates the UE to monitor PDCCH in the subsequent DRX On duration. If the UE does not detect the PoSS during the monitoring occasions, the UE performs PDCCH monitoring in the subsequent one DRX On duration, as shown in FIG. 5A.

In some implementations, for TDD downlink transmission, if the DAI (downlink assignment index) is configured, the gNB can determine whether the UE misses the PDCCH, and the UE shall perform the following behaviors in Active Time.

During the Active Time, the UE monitors the PoSS in the monitoring occasions of PoSS in the Active Time. If the UE does not detect the power saving signal with PDSCH scheduling indication during the monitoring occasions, the following operations shall be performed.

In some implementations, if the PoSS can indicate PDCCH monitoring skipping for a sleeping duration, the UE assumes the PoSS indicates that the UE monitors the PDCCH in the subsequent fixed duration, or that the UE monitors PDCCH until the next subsequent PoSS indicating a new PDCCH monitoring skipping indication. In some implementations, if the PoSS without PDSCH scheduling information can indicate PDCCH monitoring skipping for a sleeping duration, the UE assumes the PoSS indicates the UE monitors the PDCCH in the sleeping duration.

In some implementations, if the PoSS indicates the maximum MIMO layer, the UE assumes that 1) the maximum MIMO layer value information is a fixed value or a default value, or 2) the maximum MIMO layer is larger one between the last recent maximum MIMO layer and the MIMO layer value indicated by the subsequent PDCCH, or 3) the maximum MIMO layer is the last recent maximum MIMO layer. In some implementations, the above default maximum MIMO layer value does not valid until the next PoSS indicating the new maximum MIMO layer. In some implementations, if the MIMO layer indicated by the PDCCH is larger than the maximum MIMO layer indicated by the PoSS, the UE assumes the MIMO layer is invalid or the UE does not expect this scheduling. In some implementations, the default value is the MIMO layer indicated by the higher layer parameter in UEAssistanceInformation reported by the UE. In some implementations, the default value or the fixed value are the maximum MIMO layer configured by the higher layer parameter for the serving cell or the BWP. In some implementations, the fixed value is a value selected from the set {2, 4, 8}. The fixed values of UL and DL are different. In some implementations, the fixed value is the same as the default value.

In some implementations, if the UE monitors that the MIMO layer value indicated by the PDCCH 1 in the Active Time is larger than the maximum MIMO layer indicated by the PoSS and the UE does not report HARQ-ACK information of a PDSCH scheduled by a PDCCH 2 before the PDCCH 1, the UE assumes that the MIMO layer is valid scheduled by PDCCH 1, or the UE assumes that the MIMO layer is invalid or the scheduling PDSCH is not expected for the UE.

In some implementations, if the UE monitors that the MIMO layer value indicated by N consecutive PDCCHs in the Active Time is larger than the maximum MIMO layer indicated by the last recent PoSS, the UE assumes that the MIMO layer is valid scheduled by the next subsequent PDCCHs until the next new maximum MIMO layer is applied or indicated, or the UE assumes that the MIMO layer is invalid or the scheduling PDSCH is not expected for the UE.

For example, if the number of MIMO layers indicated by a number of consecutive PDCCHs is larger than the maximum number of MIMO layers indicated by the last recent PoSS, the UE shall fall back to the maximum MIMO layer, the fall back value being 4 for UL transmission and 8 for DL transmission, for a feed-back durations or until the next new maximum MIMO layer is applied.

In some implementations, for the missed detection of PoSS with maximum MIMO layer indication, if the UE monitors N PDCCHs indicating the number of MIMO layer larger than the maximum MIMO layer, the UE shall assume the maximum MIMO layer falls back to a fixed value for a feed-back durations or until the next new maximum MIMO layer is applied. In some implementations, the fixed value is 4 for UL transmission and 8 for DL transmission. In some implementations, N is not smaller than 1.

In some implementations, for PoSS in Active Time, if the UE does not detect the PoSS with updated minimum offset and the UE does not successfully receive a number of subsequent N consecutive PDSCHs with an invalid minimum offset value scheduled by PDCCHs which are detected after the last recent PoSS, the UE shall switch the minimum k0/k1/k2/A-CSI-RS trigger offset/A-SRS trigger offset to 0 or a default value. In some implementations, the default value is the minimum value configured by the higher layer parameters. In some implementations, the default value is 0.

In some implementations, the minimum offset value includes minimum k0/k1/k2/A-CSI-RS trigger offset/A-SRS trigger offset.

In some implementations, for the missed detection of PoSS with maximum MIMO layer indication, if the UE monitors N consecutive PDCCHs indicating the number of MIMO layer larger than the maximum MIMO layer, the UE shall assume the maximum MIMO layer falls back to a fixed value. In some implementations, the fixed value is 4 for UL transmission and 8 for DL transmission. In some implementations, N is not smaller than 1.

In some implementations, for PoSS in Active Time, if the UE does not detect the PoSS with updated minimum offset and the UE does not successfully receive a number of subsequent N consecutive PDSCHs with an invalid minimum offset value scheduled by PDCCHs which are detected after the last recent PoSS, the UE shall switch the minimum k0/k1/k2/A-CSI-RS trigger offset/A-SRS trigger offset to 0 or a default value. In some implementations, N is not smaller than 1. In some implementations, the default value is the minimum value configured by the higher layer parameters. In some implementations, the default value is 0.

In some implementations, if the PoSS indicates a minimum k0/k1/k2/A-CSI-RS trigger offset/A-SRS trigger offset, and the k0/k1/k2/A-CSI-RS trigger offset/A-SRS trigger offset indicated by the PDCCH with data scheduling is smaller than the minimum value, the UE assumes that 1) the k0/k1/k2/A-CSI-RS trigger offset/A-SRS trigger offset is invalid, or 2) the k0/k1/k2/A-CSI-RS trigger offset/A-SRS trigger offset is valid indicated by the current PDCCH if the last recent N PDSCHs scheduled by PDCCH before the current PDCCH are not received successfully or reported a NACK. In some implementations, N is larger than 1. In some implementations, the default value is 0. In some implementations, the default value is the minimum value configured by the higher layer parameters. In some implementations, the fixed value is 0. In some implementations, the fixed value is the same as the default value.

In some implementations, if the UE monitors that the k0/k1/k2/A-CSI-RS trigger offset/A-SRS trigger offset indicated by the PDCCH is smaller than the minimum k0/k1/ k2/A-CSI-RS trigger offset/A-SRS trigger offset indicated by the PoSS, and the UE reports NACK of a PDSCH scheduled by a PDCCH before the PDCCH with an invalid value, the UE assumes that the k0/k1/k2/A-CSI-RS trigger offset/A-SRS trigger offset is valid scheduled by the PDCCH.

In some implementations, if the UE monitors that the k0/k1/k2/A-CSI-RS trigger offset/A-SRS trigger offset indicated by the PDCCH is smaller than the minimum k0/k1/k2/A-CSI-RS trigger offset/A-SRS trigger offset indicated by the PoSS, and the UE does not receive a PDSCH successfully scheduled by a last recent PDCCH with an invalid indication of k0/k1/k2/A-CSI-RS trigger offset/A-SRS trigger offset before the PDCCH, the UE assumes that the k0/k1/k2/A-CSI-RS trigger offset/A-SRS trigger offset is valid scheduled by the PDCCH.

During the Active Time, the UE monitors the PoSS in the monitoring occasions of the PoSS in the Active Time. If the UE monitors a PDCCH with an invalid value/indication according to the power saving techniques values/indication indicated by the PoSS, the following operations shall be performed.

In some implementations, for the missed detection of PoSS with maximum MIMO layer indication, if the UE monitors N consecutive PDCCHs indicating the number of MIMO layer larger than the maximum MIMO layer, the UE shall assume the maximum MIMO layer falls back to a fixed value for a feed back durations or until the next new maximum MIMO layer is applied. In some implementations, the fixed value is 4 for UL transmission and 8 for DL transmission. In some implementations, N is not smaller than 1.

In some implementations, for the missed detection of PoSS with maximum MIMO layer indication, if the UE monitors N consecutive PDCCHs indicating the number of MIMO layer larger than the maximum MIMO layer, the UE shall assume the maximum MIMO layer falls back to a fixed value. In some implementations, the fixed value is 4 for UL transmission and 8 for DL transmission. In some implementations, N is not smaller than 1.

In some implementations, for PoSS in Active Time, if the UE does not detect the PoSS with updated minimum offset and the UE does not successfully receive a number of subsequent N consecutive PDSCHs with an invalid minimum offset value scheduled by PDCCHs which are detected after the last recent PoSS, the UE shall switch the minimum k0/k1/k2/A-CSI-RS trigger offset/A-SRS trigger offset to 0 or a default value for a feed-back durations or until the next minimum k0/k1/k2/A-CSI-RS trigger offset/A-SRS trigger offset is applied. In some implementations, N is not smaller than 1. In some implementations, the default value is the minimum value configured by the higher layer parameters. In some implementations, the default value is 0.

In some implementations, for PoSS in Active Time, if the UE does not detect the PoSS with updated minimum offset and the UE does not successfully receive a number of subsequent N consecutive PDSCHs with an invalid minimum offset value scheduled by PDCCHs which are detected after the last recent PoSS, the UE shall switch the minimum k0/k1/k2/A-CSI-RS trigger offset/A-SRS trigger offset to 0 or a default value. In some implementations, the default value is the minimum value configured by the higher layer parameters. In some implementations, the default value is 0.

In some implementations, if the PoSS indicates the maximum MIMO layer, the UE assumes that 1) the maximum MIMO layer value information is a fixed value or a default value, or 2) the maximum MIMO layer is the larger one between the last recent maximum MIMO layer and the MIMO layer value indicated by the subsequent PDCCH, or 3) the maximum MIMO layer is the last recent maximum MIMO layer indicated by PoSS. In some implementations, the above default maximum MIMO layer value does not valid until the next PoSS indicating the new maximum MIMO layer. In some implementations, if the MIMO layer indicated by the PDCCH is larger than the maximum MIMO layer indicated by the PoSS, the UE assumes the MIMO layer is invalid or the UE does not expect this scheduling. In some implementations, the default value is the MIMO layer indicated by the higher layer parameter in UEAssistanceInformation reported by the UE. In some implementations, the default value or the fixed value are the maximum MIMO layer configured by the higher layer parameter for the serving cell or the BWP. In some implementations, the fixed value is a value selected from the set {2, 4, 8}. The fixed values of UL and DL are different. In some implementations, the fixed value is the same as the default value.

In some implementations, if the UE monitors that the MIMO layer value indicated by the PDCCH 1 in the Active Time is smaller than the maximum MIMO layer indicated by the PoSS and the UE does not report HARQ-ACK information of a PDSCH scheduled by a PDCCH 2 before the PDCCH 1, the UE assumes that the MIMO layer is valid scheduled by PDCCH 1, or the UE assumes that the MIMO layer is invalid or the scheduling PDSCH is not expected for the UE.

In some implementations, if the UE reports NACK of a N consecutive PDSCHs scheduled by PDCCHs, and the PDCCHs indicates the MIMO layer value that is larger than the maximum MIMO layer indicated by the PoSS, the UE assumes that the MIMO layer scheduled by the subsequent PDCCHs is valid until the next subsequent new maximum MIMO layer is indicated by PoSS. In some implementations, N is an integer and not less than 1.

In some implementations, if the PoSS indicates a minimum k0/k1/k2/A-CSI-RS trigger offset/A-SRS trigger offset, and the k0/k1/k2/A-CSI-RS trigger offset/A-SRS trigger offset indicated by the PDCCH with data scheduling is smaller than the minimum value, the UE assumes that 1) the k0/k1/k2/A-CSI-RS trigger offset/A-SRS trigger offset is invalid, or 2) the k0/k1/k2/A-CSI-RS trigger offset/A-SRS trigger offset is valid indicated by the current PDCCH if the last recent N PDSCHs scheduled by PDCCH before the current PDCCH are not received successfully or reported a NACK. In some implementations, N is larger than 1. In some implementations, the default value is 0. In some implementations, the default value is the minimum value configured by the higher layer parameters. In some implementations, the fixed value is 0. In some implementations, the fixed value is the same as the default value.

In some implementations, if the UE reports NACK of a N consecutive PDSCHs scheduled by PDCCHs, and the k0/k1/k2/A-CSI-RS trigger offset/A-SRS trigger offset indicated by the PDCCH is smaller than the minimum k0/k1/k2/A-CSI-RS trigger offset/A-SRS trigger offset indicated by the PoSS, the UE assumes that the k0/k1/k2/A-CSI-RS trigger offset/A-SRS trigger offset scheduled by the subsequent PDCCH is valid. In some implementations, N is an integer and not less than 1.

In some implementations, the fixed duration or the default timer is configured by a higher layer parameters or a predefined configuration, and the unit is ms. In some implementations, the optional value of the fixed duration may be an any value in the set of {1, 2, 3, 4, 5, 6, 8, 10, 20, 30, 40, 50, 60, 80, 100, 200, 300, 400, 500, 600, 800, 1000, 1200, 1600} or ($\alpha1^{\beta1}*\alpha2^{\beta2}*\alpha3^{\beta3}$), where α1, α2 and α3 are any values in the set {1, 2, 3, 5}, and β1, β2 and β3 are natural numbers less than 5. In some implementations, the fixed duration or the default timer is not larger than the DRX On duration Timer. In some implementations, the position information of the fixed duration is configured by the higher layer parameters.

In some implementations, if the PoSS is only sent when indicating a state or value of the power saving information and the UE does not detect the PoSS within the monitoring time, the UE assumes the power saving signal/The channel indicates another state or value of the power saving information.

In some implementations, before performing the foregoing operations, the UE has a fixed preparation time, where the preparation time is configured by a predefined configuration or a high layer signaling.

In some implementations, after performing the foregoing operations, the parameter value is valid only for a period of default duration. After the time period, the UE adopts another state of the power saving information, or schedules the value indicated by the DCI. The default duration is configured by the predefined configuration or higher layer parameters. The value is Tdefault, 0≤Tdefault≤Tdrx-Onduration, and the unit is ms.

For example, the PoSS in the Active Time indicates a minimum k0/k1/k2/A-CSI-RS trigger offset/A-SRS trigger offset, and the PoSS is an enhanced DCI format 0_0/0_1/1_0/1_1 without data scheduling information. The UE detects the k0/k1/k2/A-CSI-RS trigger offset/A-SRS trigger offset value indicated by a scheduling DCI is smaller than the minimum k0/k1/k2/A-CSI-RS trigger offset/A-SRS trigger offset values considered by the UE due to the missed detection of a certain PoSS. The UE assumes that the minimum k0/k1/k2/A-CSI-RS trigger offset/A-SRS trigger offset value is 0, or the UE assumes that the k0/k1/k2/A-CSI-RS trigger offset/A-SRS trigger offset value indicated by the DCI is valid after two times NACK report of the subsequent consecutive PDSCHs after the last recent detected PoSS.

For example, the PoSS in the Active Time indicates the maximum MIMO layer value information, and the PoSS is an enhanced DCI format 0_0/0_1/1_0/1_1 without data scheduling information. The UE detects a MIMO layer value of the scheduling DCI is greater than the maximum MIMO layer value configured for the UE, because the UE miss detected a certain PoSS before receiving the scheduling DCI. The UE assumes the maximum MIMO layer is a fixed value of 4 for UL and 8 for DL, or UE assumes the MIMO layer value indicated by the scheduling DCI is valid, if two times NACK report of the subsequent consecutive PDSCHs after the last recent detected PoSS.

For example, the PoSS in the Active Time indicates a minimum k0/k1/k2/A-CSI-RS trigger offset/A-SRS trigger offset, and the PoSS is an enhanced DCI format 0_0/0_1/1_0/1_1 with data scheduling information. The UE detects the k0/k1/k2/A-CSI-RS trigger offset/A-SRS trigger offset value indicated by a scheduling DCI is smaller than the minimum k0/k1/k2/A-CSI-RS trigger offset/A-SRS trigger offset values considered by the UE due to the missed detection of a certain PoSS. In addition, there are more than two PDSCHs scheduled by the PDCCH with invalid k0/k1/k2/A-CSI-RS trigger offset/A-SRS trigger offset indication during the interval between the missed PoSS and the HARQ-ACK report of the PDSCH scheduled by the PoSS. The UE assumes that the minimum k0/k1/k2/A-CSI-RS trigger offset/A-SRS trigger offset value is 0 for the subsequent PDCCH before a new minimum k0/k1/k2/A-CSI-RS trigger offset/A-SRS trigger offset indication, or the UE assumes that the k0/k1/k2/A-CSI-RS trigger offset/A-SRS trigger offset value indicated by the DCI is valid after two subsequent consecutive PDSCHs after the last recent detected PoSS are not received successfully. On the other way, the gNB shall send a new PoSS indicating the new minimum k0/k1/k2/A-CSI-RS trigger offset/A-SRS trigger offset after two times NACK report of the subsequent consecutive PDSCHs after the last recent detected PoSS.

Figure 5B:
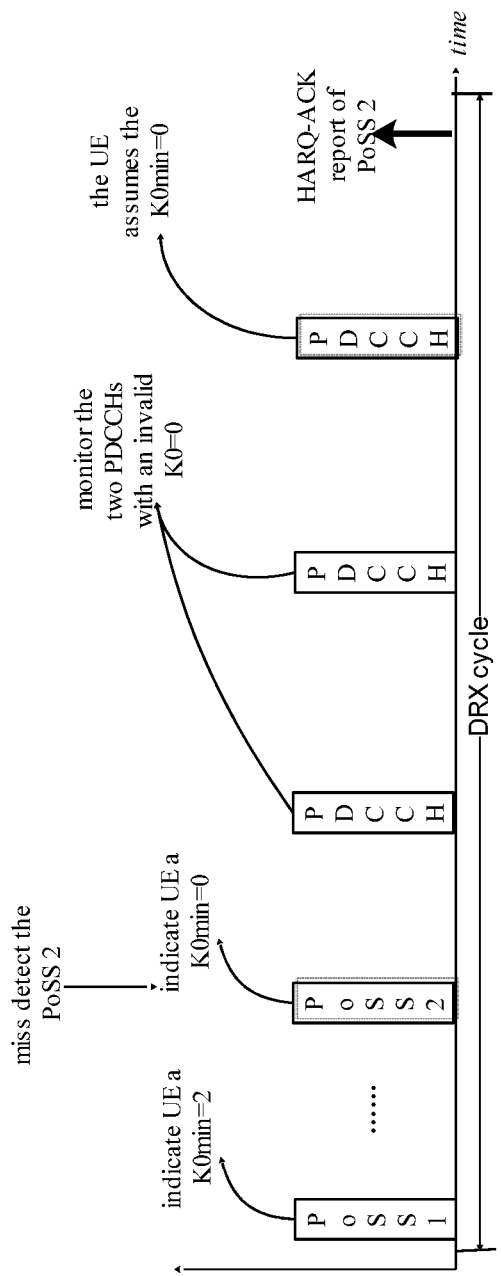

For PoSS within Active Time, the UE is indicated a minimum K0=2. If the indication that minimum K0 equals to zeros is missed by UE, and gNB schedules PDSCH with K0=0 in subsequent several slots, UE may assume TDRA entries selected by PDCCH is invalid. If the DCI indicating the minimum K0 schedule the PDSCH and there are multiple PDCCH with data scheduling before the HARQ-ACK report of the DCI, the UE shall miss the subsequent PDSCHs with an invalid K0 until the next PoSS indicating a new minimum K0 is detected by the UE. If the UE does not report acknowledgement information of a number of consecutive PDSCHs after the gNB indicates the K0 min=0, the gNB will transmit a new PoSS to the UE or the UE may assume K0 min=0 to receive the subsequent PDSCH until the new minimum K0 is applied, as shown in FIG. 5B.

For example, the PoSS in the Active Time indicates the maximum MIMO layer value information, and the PoSS is an enhanced DCI format 0_0/0_1/1_0/1_1 without data scheduling information. The UE detects a MIMO layer value of the scheduling DCI is greater than the maximum MIMO layer value configured for the UE, because the UE miss detected a certain PoSS before receiving the scheduling DCI. The UE assumes the maximum MIMO layer is a fixed value of 4 for UL and 8 for DL, or UE assumes the MIMO layer value indicated by the scheduling DCI is valid, if two times NACK report of the subsequent consecutive PDSCHs after the last recent detected PoSS.

In some implementations, if the drx-InactivityTimer or drx-RetransmissionTimerDL or drx-RetransmissionTimerUL or ra-ContentionResolutionTimer of the current DRX cycle is still running in the previous Offset time of one or more DRX On durations, the UE does not perform the PoSS monitoring operation in the time. In some implementations, the gNB will not send PoSS during the period of the drx-InactivityTimer or drx-RetransmissionTimerDL or drx-RetransmissionTimerUL or ra-ContentionResolutionTimer running.

Embodiment 2 (Feedback and Fallback Mechanism)

Scheme 1

In the outside Active Time, if the UE does not detect the PoSS within the monitoring occasions, the UE performs the following operations:

In some implementations, the UE performs the foregoing operations, e.g., the operations in Embodiment 1 to perform the subsequent operations before the new indication of the power saving techniques arrives.

Figure 6A:
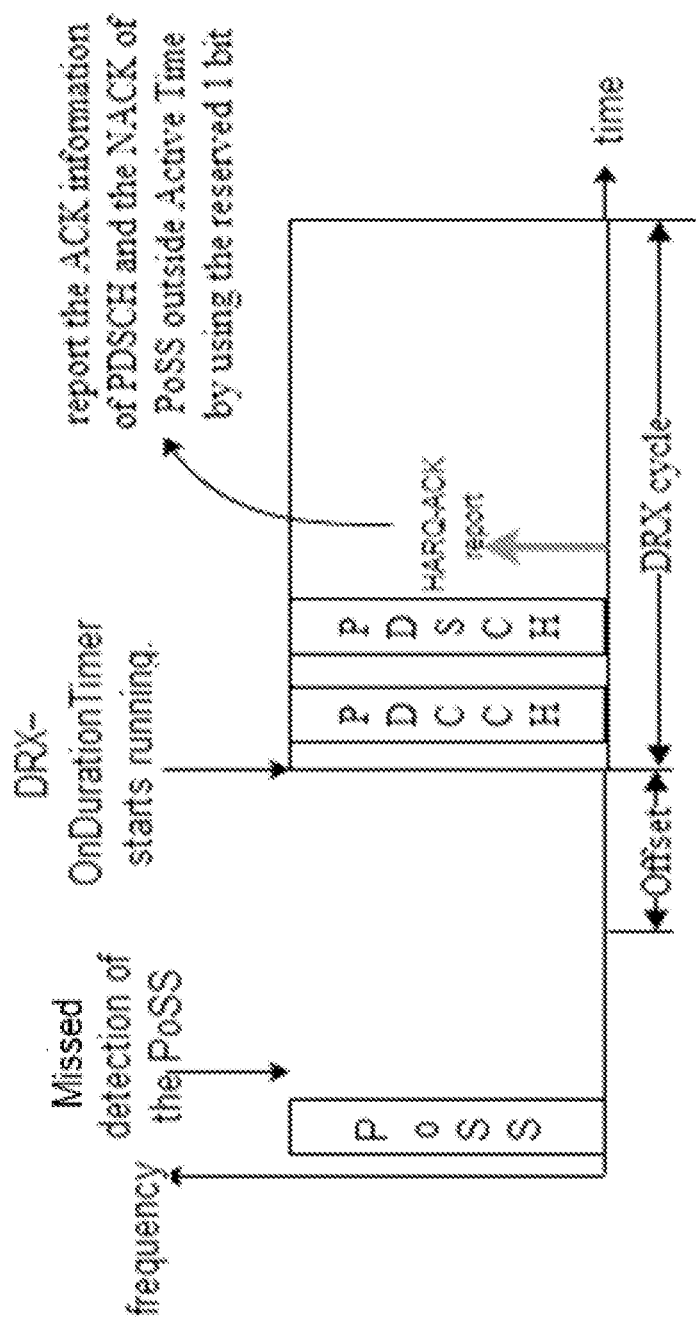
FIGS. 6A and 6B shows examples of a diagram showing a power saving signal feedback procedure.

In some implementations, if the UE receives the first PDSCH in the Active Time successfully and reports the ACK information of the PDSCH, the UE shall not report the HARQ-ACK information of the PoSS outside Active Time. In some implementations, if the UE misses the reception of the first PDSCH in the Active Time and shall report the NACK information of the PDSCH, the UE shall report the HARQ-ACK information of the PoSS outside Active Time, as shown in FIG. 6A.

In some implementations, if the UE reports the HARQ-ACK information of the PoSS outside Active Time, the 1 bit width HARQ-ACK information of the PoSS shall be transmitted at the last bit field of the HARQ-ACK report information of the first PDCCH in Active Time. In some implementations, the additional reserved 1-bit HARQ-ACK field of the PoSS in the HARQ-ACK report information of the first PDSCH in Active Time is indicated by the PDCCH scheduling the first PDSCH or configured by higher layer parameters. In some implementations, the reserved 1-bit HARQ-ACK field of the PoSS is set to null or '0' if the UE does not required to feed back the HARQ-ACK information of PoSS outside Active Time. In some implementations, the reserved 1-bit HARQ-ACK field is set to '0', if the UE is required to feed back the HARQ-ACK information of PoSS and the PoSS is not detected by the UE. In some implementations, the reserved 1-bit HARQ-ACK field is set to '1', if the UE is required to feed back the HARQ-ACK information of PoSS and the PoSS is detected by the UE. In some implementations, the reserved 1-bit HARQ-ACK field is set to '1', if the UE is required to feed back the HARQ-ACK information of PoSS and the PoSS is not detected by the UE. In some implementations, the reserved 1-bit HARQ-ACK field is set to '0', if the UE is required to feed back the HARQ-ACK information of PoSS and the PoSS is detected by the UE.

In some implementations, the UE determines whether to feedback the monitoring of the PoSS according to the type of power saving information indicated by the PoSS. In some implementations, the UE feeds back the HARQ-ACK information of PoSS if the PoSS can indicate the UE at least one of the following 1) to or not to monitor PDCCH in the subsequent On durations, or 2) BWP indicator, or 3) the maximum MIMO layer, or 4) the minimum k0/k1/k2/A-CSI-RS trigger offset/A-SRS trigger offset, and the like.

The proposed technologies can increase the reliability of the indication of the outside Active Time power saving scheme, increase the robustness, and reduce the impact on the system service transmission.

During the Active time, the UE shall performs as following:

In some implementations, the K0 and K2 of the PDSCH scheduled by the PoSS in Active Time are not larger than 1 configured by the higher layer parameters. In some implementations, the interval between the PoSS and the HARQ-ACK report of the PDSCH scheduled by the PoSS in Active Time is not larger than N slots. In some implementations, the value N is configured by the higher layer parameters or the predefined configuration. In some implementations, the N shall be less than 2. In some implementations, the UE needs not monitor PDCCH during the interval between the PoSS and the HARQ-ACK report of the PDSCH scheduled by the PoSS in Active Time. In some implementations, the gNB may not transmit PDCCH during the interval between the PoSS and the HARQ-ACK report of the PDSCH scheduled by the PoSS in Active Time.

Scheme 2

In the outside Active Time, if the UE does not detect the PoSS within the monitoring occasions, the UE performs the following operations:

In some implementations, the UE performs the foregoing operations, e.g., the operations in Embodiment 1 to determine the value of the potential power saving techniques indicated by the PoSS.

In some implementations, the UE determines whether to feedback the monitoring of the PoSS according to the type of power saving information indicated by the PoSS. If the UE successfully receives the PoSS, the UE feedbacks one bit '1' indicating ACK. If the UE does not monitor the PoSS, the UE feedbacks one bit '0' indicating NACK.

In some implementations, the UE performs PoSS monitoring feedback if the power saving information includes at least one of the following: BWP ID information, minimum k0/k1/k2/A-CSI-RS trigger offset/A-SRS trigger offset value. In some implementations, the UE does not perform feedback on the PoSS monitoring situation if the power saving information includes at least one of the following: whether the UE monitors PDCCH information in the subsequent one or more ON durations, the maximum MIMO layer value, the PDCCH listening operation/activation, and/or the activating operation/dormant state activation on the SCell when deactivating the operation information.

In some implementations, the UE determines, according to the type of the latest scheduling information (such as DL-SPS release), whether the UE feeds back the monitoring of the PoSS. If the PDCCH indicates the SPS PDSCH release, the UE feeds back the PoSS feedback information together with the HARQ-ACK information of the SPS PDSCH.

For example, the UE monitors the power saving signal at the outside Active Time according to the RRC configuration information. The power saving scheme that the power saving signal may indicate includes at least one of: whether to monitor the PDCCH information in the subsequent DRX On duration, the BWP indication information, the minimum k0 value (e.g., receiving, by the UE, a minimum interval slot number between a PDCCH moment and a PDSCH start time scheduled by the PDCCH), or the maximum number of MIMO layers. The UE knows the location information of the power saving signal. If the UE does not detect the power saving signal in the monitoring time, the UE will feedback the monitoring result of the power saving signal according to the reception condition of the first PDSCH in the Active Time. If the UE fails to receive the first PDSCH in the Active Time, the UE reserves the last bit of the power saving signal HARQ-ACK feedback monitoring of the power saving signal in the uplink feedback payload. In some implementations, the monitoring success is '1' and the monitoring failure is '0'.

For example, the UE monitors the power saving signal in the outside Active Time according to the RRC configuration information. In some implementations, the UE includes the BWP switching information in the indication information. In some implementations, the UE performs HARQ-ACK feedback regardless of whether the UE successfully monitors the power saving signal.

During the Active Time, the UE determines the monitoring occasions of the PoSS according to the resource information configured by the high layer signaling.

In some implementations, the predefined configuration information indicates that the status of one or more indication domains in the PoSS is all '1' or all '0', wherein all '1' indicates that the UE needs to feed back the HARQ-ACK information of the PoSS.; all '0' indicates that the UE does not required to feed back the HARQ-ACK feedback of the PoSS.

For example, the UE monitors the power saving signal in the Active Time according to the RRC configuration information, and the UE knows that the power saving signal is DCI format 1_1, and reuses two domains to indicate the power saving scheme: whether to successfully monitor the PDCCH information in the DRX On duration and the minimum k0/k1/k2/A-CSI-RS trigger offset/A-SRS trigger offset value. After the UE monitors the power saving signal, if the domain of the MCS scheme index and the HARQ-ACK indicating the transport block 1 in the DCI is all '0', the UE does not need to feed back the monitoring condition of the power saving signal. If the domain of the MCS scheme index and the HARQ-ACK indicating the transport block 1 in the DCI is all '1', the UE needs to feed back the monitoring of the power saving signal in the HARQ-ACK feedback of the subsequent PDSCH.

Scheme 3 (Feedback and Response Mechanism)

In the case of configuring the DRX, when the UE monitors the power saving signal at the outside Active Time, the RRC signaling configures at least one of i) the possible N power saving schemes in the power saving signal monitored by the UE, ii) the starting bit position of each power saving scheme, iii) length of each power saving scheme, or iv) start position of the trigger state. The UE will feedback the monitoring of the PoSS after the power saving signal monitoring occasions ended.

In some implementations, the resource allocation of the HARQ-ACK report of the PoSS is the same as or multiplexed with the resource assigned by the last recent PDCCH or configured by the higher layer parameters, or is a fixed feedback resource of the power saving signal of the outside Active Time. In some implementations, the start position of the feedback time domain resource is before the start position of the DRX On-duration and an offset interval before the DRX On-duration.

In some implementations, the monitoring occasions of the RRC configurable power saving signal may exist another offset feedback before the offset of the DRX On duration. The function is that the UE can feedback in the offset$_{feedback}$ after ending the monitoring of the power saving signal.

In some implementations, if the UE does not detect the power saving signal in the monitoring time, the UE uses the PUSCH or PUCCH or SRS resources after entering the DRX On duration according to the number of power saving schemes N and the bitmap position sequence configured by the RRC. Depending on whether the received information indication is '1' or '0,' the N bits information is fed back to inform the gNB that the indication information of the power saving signal is not received. If the UE monitors the power saving signal on the configuration monitoring resource, the UE uses the PUSCH or the PUCCH or the SRS resource according to the bit sequence of the RRC configuration, and indicates "1" to report the ACK information, and '0' to report the NACK information of the PoSS outside Active Time.

In some implementations, the gNB transmits a HARQ-ACK feedback response information of the PoSS to the UE, and the response information is indicated in the first DCI format of the Active Time according to a predefined indication manner. The predefined indication mode is to add an N-bit indication field in the DCI. In some implementations, the bits of a predefined domain in the DCI may be set to all '0' to indicate that no feedback is received. In some implementations, the bits of the predefined domain in the DCI may be set to all '1's to indicate that the HARQ-ACK feedback of the power saving signals/channels is received successfully.

Figure 6B:
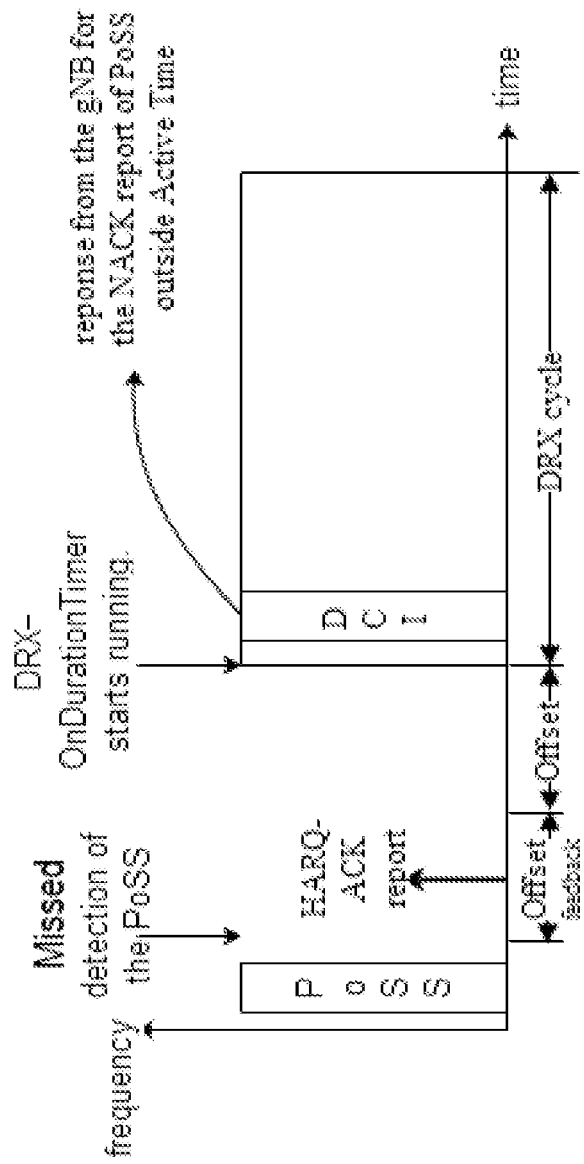

For example, the UE monitors the power saving signal at the outside Active Time according to the higher layer parameters or the predefined configuration information, and the UE will feedback the HARQ-ACK information of the power saving signal regardless of whether the UE detects the power saving signal. In some implementations, the offset$_{feedback}$ and the resources of the HARQ-ACK report of the PoSS are configured by RRC. After the UE feeds back the power saving signal, it waits for the response information of the gNB at the Active Time, and the response information is carried by the DCI of the Active Time as shown in FIG. 6B.

Embodiment 4 (MAC Layer Mechanism)

If the UE does not detect the PoSS during the monitoring occasions, the UE performs the following operations:

According to the MAC layer procedure, the UE assumes that the power saving techniques are not performed successfully, and the UE shall perform the DRX configuration operation.

Embodiment 5 (Multi-Beam Mechanism)

Scheme 1 (Multi-Beam Receiving Signaling Configuration)

In some implementations, the monitoring occasions of the PoSS in the outside Active Time is determined by the limited number of search spaces and the limited number of CORESETs configured by the higher layer parameters. For the PoSS monitored in the outside Active Time by the UE, the transmission resource of the PoSS is assigned as the following:

In some implementations, the number of CORESET of the PoSS is equal to 1. The number of the search spaces is larger than 1 and not larger than the maximum number of search spaces of the current BWP. In some implementations, the search space of the PoSS are associated with the CORESET. In some implementations, the active TCI states of a CORESET are activated by higher layer parameters. In some implementations, the active TCI states of a CORESET is larger than 1 or equal to the number of search spaces of PoSS. In some implementations, the active TCI states associated with each search space of the PoSS are respectively configured by the higher layer parameters. In some implementations, the active TCI states are associated with each search space respectively according to a predefined order.

Figure 7A:
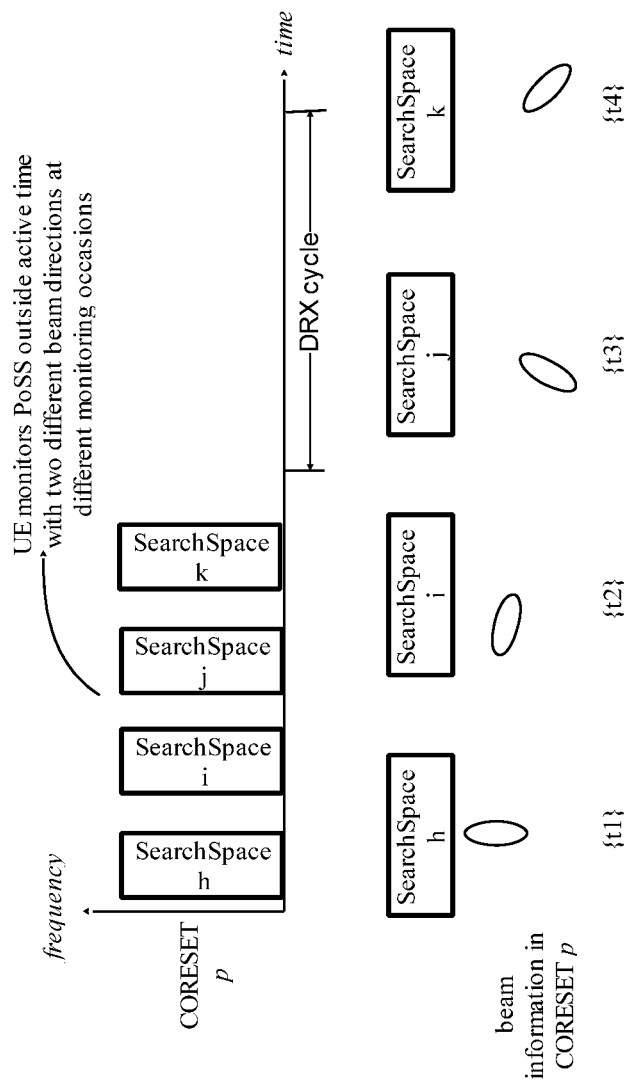
FIGS. 7A and 7B shows examples of the PoSS monitoring occurring outside Active Time with different beam in different search spaces associate with one and multiple CORE-SET(s).

For example, for PoSS transmitted in outside Active Time, the UE monitors PoSS by using the beam directions associated with the active TCI states {T1, T2, T3, T4} in CORESET p. The active TCI states associated with the search space ID {h, i, j, k} are {T1, T2, T3, T4} configured by the higher layer parameters. Thus, the UE monitors the PoSS with beam direction associated with the TCI states {T1, T2, T3, T4} in search space {h, i, j, k} respectively, as shown in FIG. 7A.

In some implementations, the number of CORESET of the PoSS is equal to 1. The number of the search spaces is larger than 1 and not larger than the maximum number of search spaces of the current BWP. In some implementations, the search space of the PoSS are associated with the CORESET. In some implementations, the active TCI states of a CORESET are activated by higher layer parameters. In some implementations, the active TCI states of a CORESET is larger than 1 or can be larger than the number of search spaces of PoSS. In some implementations, the active TCI states associated with each search space of the PoSS are respectively configured by the higher layer parameters. In some implementations, the active TCI states are associated with each search space respectively according to a predefined order.

For example, for PoSS transmitted in outside Active Time, the UE monitors PoSS by using the beam directions associated with the active TCI states{T1, T2, T3, T4, T5, T6, T7} in CORESET p. The active TCI states associated with the search space ID {h, i, j, k} are {{T1,T2}, {T3,T4}, {T5,T6}, {T7}} configured by the higher layer parameters. Thus, the UE monitors the PoSS with one or more different beam directions associated with the TCI states {{T1,T2}, {T3,T4}, {T5,T6}, {T7}} at different monitoring occasions of search space {h, i, j, k} respectively.

In some implementations, the number of CORESET of the PoSS is not less than 1. The number of the search spaces is larger than 1 and not larger than the maximum number of search spaces of the current BWP. In some implementations, the search space of the PoSS are associated with the CORESET. In some implementations, the active TCI states of a CORESET are activated by higher layer parameters. In some implementations, the active TCI states of a CORESET is larger than 1 or can be larger than the number of search spaces of PoSS. In some implementations, the active TCI states associated with each search space of the PoSS are respectively configured by the higher layer parameters. In some implementations, the active TCI states are associated with each search space respectively according to a predefined order.

Figure 7B:
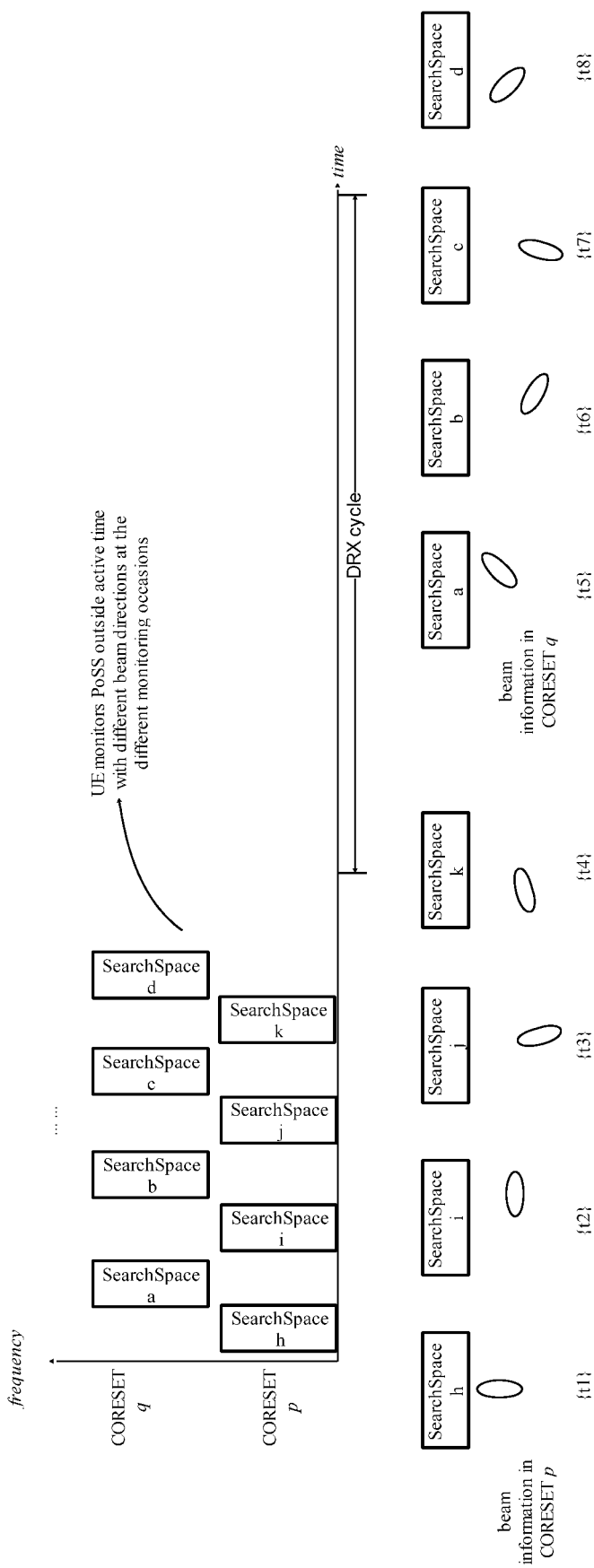

For example, for PoSS transmitted in outside Active Time, the UE monitors PoSS by using the beam directions associated with the active TCI states{T1, T2, T3, T4} and {T5, T6, T7, T8} in CORESET p and CORESET q respectively. The active TCI states associated with the search space ID {h, i, j, k} and {a, b, c, d} are {T1, T2, T3, T4} and {T5, T6, T7, T8} configured by the higher layer parameters. Thus, the UE monitors the PoSS with different beam direction associated with the active TCI states {T1, T2, T3, T4} and {T5, T6, T7, T8} at different monitoring occasions of search space {h, i, j, k} and {a, b, c, d} respectively, as shown in FIG. 7B.

In some implementations, the monitoring occasions means the search space. In some implementations, the different monitoring occasions are corresponding to the different search space. In some implementations, the different monitoring occasions are corresponding to the different period in a search space.

In some implementations, if the active TCI states associated with the search space is larger than 1, namely, the available beam information in one search space is larger than 1, the UE shall monitor PoSS with different beams in different times of one search space. In some implementations, the interval between the adjacent time with different beams for the UE is not less than the time for beam switching for FR2. In some implementations, the time for beam switching is the same as or configured by the beamSwitch Timing parameter. The beamSwitch Timing parameter indicates the minimum number of OFDM symbols between the DCI triggering of aperiodic CSI-RS and aperiodic CSI-RS transmission. The number of OFDM symbols is measured from the last symbol containing the indication to the first symbol of CSI-RS. The UE includes this field for each supported sub-carrier spacing.

In some implementations, the beam RS associated with the active TCI states is selected from the most recent N1 CSI-RS s or the most recent N2 SSB. In some implementations, the N1 or N2 is not larger than the number of active TCI states.

In some implementations, the monitoring occasions of the PoSS outside Active Time is not larger than a Threshold). In some implementations, the Threshold) is not larger than 20 ms. In some implementations, the Threshold) is not larger than the DRX On duration. In some implementations, the Threshold) is not less than N slots. In some implementations, N is not less than 1.

In some implementations, a CORESET with the multiple active TCI states is only used for the PoSS monitoring in outside Active Time. In some implementations, if a CORESET with multiple also used for the PoSS in the Active Time, the UE performs the PoSS monitoring in Active Time with only one default active TCI state. In some implementations, the default active TCI state is predefined or configured by the higher layer parameters.

In some implementations, the all symbols of the slots before the DRX On duration with an offset are used to monitor or transmit the PoSS. In some implementations, the search spaces or monitoring occasions are configured by a new higher layer parameter dedicated for the PoSS outside Active Time.

In some implementations, the slot format of the monitoring occasions of the PoSS outside Active Time is dedicated or different with that of the PoSS in Active Time. In some implementations, the monitoring period of the PoSS outside Active Time is the same as that of SSB for beam sweeping operations.

In some implementations, the link structure for beam sweeping operations of the PoSS outside Active Time is dedicated or different with the current radio link beam detection in Rel 15. In some implementations, the active TCI states are at least associated with QCL TypeD.

In some implementations, the predefined order refers to the correspondence between TCI states in a CORESET and the Search Space associated with this CORESET as follows:

Assume the followings: $N_s$ indicates the number of Search Spaces of PoSS; $N_p$ indicates the number of CORESETs, $N_{TCI\_state}$ indicates the number of active TCI states configured in each CORESET; Nsi search spaces is configured to be associated with each CORESET, where i≤$N_s$. In some implementations, the number of configurable TCI states in each CORESET satisfies: floor (Nt/($N_t$*Np))≤$N_{TCI\_state}$≤ceil ($Nt^{UE}$/nt). In some implementations, the beam direction (nt*$N_{TCI\_state}$) provided in each control resource set is from small to small. The large order corresponds to the Nsi search spaces in which the indexes are sorted from small to large. The number of TCI states that can correspond to each search space satisfies: $N_{TCI\_state}^{search\ space}$≤$Nt^{UE}$, Nt is the total number of beams used for PoSS transmission, $Nt^{UE}$ is the number of receiving beam directions at the same time that the UE can support, and Nt is the maximum number of beam directions that can be associated with one TCI state.

In some implementations, the base station sends the power saving signal with the beam directions configured by the higher layer parameters in each search space and CORESET in outside Active Time, and the power saving signal transmission information in each beam direction is the same.

In some implementations, the angle between the beam directions associated with each search space does not exceed Arx, where Arx>0 and is associated with a channel model or a reference signal.

In some implementations, for the outside Active Time, if the higher layer parameters configuration PoSS search space is not used for other downlink control signals, the CORESET can also be used for other downlink control signals, and the UE only uses the PoSS. The Search Space may use multiple receive beam direction reception mechanisms. For other search downlinks in which the downlink control signal is associated with the CORESET, the UE monitors the other downlink control signals only by using a beam direction associated with a fixed TCI state ID for signal monitoring/reception.

In some implementations, for the outside Active Time, if the search space and the CORESET of the higher layer parameters configuration are not used for other downlink control signals, the UE may use the receiving beam direction determination mode and the reception mechanism described above in the search space of the PoSS.

For example, the UE can support the following: the number of simultaneous receiving beam directions is 4; the number of target receiving beam directions configured by higher layer parameters is 16; the power saving signal has 2 control resource sets; the index is {2, 3}; the 4 active TCI state indexes in each CORESET are arranged in order from smallest to largest, e.g., $\{\{T_{1,1}, T_{1,2}, T_{1,3}, T_{1,4}\}, \{T_{2,1}, T_{2,2}, T_{2,3}, T_{2,4}\}\}$; each active TCI state can be associated with two beam directions; there are four search spaces with an index of {1, 2, 3, 4}; the corresponding CORESET index for each search space is $\{\{2\}_{s1}, \{2\}_{s2}, \{3\}_{s3}, \{3\}_{s4}\}$, the TCI state index corresponds to each search space index in the order from small to large, e.g., $\{\{T_{1,1}, T_{1,2}\}_{s1}, \{T_{1,3}, T_{1,4}\}_{s2}, \{T_{2,1}, T_{2,2}\}_{s3}, \{T_{2,3}, T_{2,4}\}_{s4}\}$; and the UE can obtain the receive beam direction of each search space: $\{\{t1, t2, t3, t4\}_{s1}, \{t5, T6, t7, t8\}_{s2}, \{t9, t10, t11, t12\}_{s3}, \{t13, t14, t15, t16\}_{s4}\}$.

The multi-beam receiving signaling configuration of this scheme is highly flexible and can greatly enhance the reliability of the UE to monitor the PoSS.

Scheme 2

The UE determines the monitoring occasions of the PoSS outside Active Time according to the configuration of higher layer parameters. The CORESET configured by higher layer parameters includes multiple active TCI states associated with multiple Search Spaces, and the MAC CE activates N1 TCI states, where N1>=1. For PoSS monitoring, the different beam directions associated with the active TCI state in the current CORESET are in accordance with a predefined configuration in the Search Space corresponding to the power save signal/channel associated with this CORESET.

In some implementations, a TCI state subset is configured by the TCI-States PDCCH-ToAddList and TCI-States PDCCH-ToReleaseList fields in the high layer signaling ControlResourceSet IE, and multiple TCI state IDs are activated by the MAC CE.

In some implementations, different search directions are used in multiple SearchSpace Sets associated with the same CORESET. Based on the receiving angle indicated by the QCL TypeD, the UE sequentially adds an angular offset offset$^{angle}$, which can be configured by the higher layer parameters, and the indicated SearchSpace ID offsets are not equal.

In some implementations, in a search space, the UE uses a TCI state-associated base beam direction, and multiple offset beam directions with an angle of α*offsetangle of the base beam direction to receive/monitor the PoSS, where α>=0, the offset$^{angle}$ being configured by predefined configuration or higher layer parameters.

In some implementations, the UE receives/monitors the PoSS in different beam directions at different times in a search space. Alternatively, the UE receives/monitor the PoSS in different search directions in one Search Space at the same time.

In some implementations, for the outside Active Time, if the higher layer parameters configuration PoSS search space is not used for other downlink control signals, the CORESET can also be used for other downlink control signals, and the UE only uses the PoSS. The Search Space receives/monitors power saving signals/channels using the base beam direction and multiple offset beam directions. For other search spaces associated with this CORESET, the UE monitors the other downlink control signals and only uses the base beam direction to receive/monitor the power save signals/channels.

In some implementations, for the outside Active Time, if the search space and the CORESET of PoSS configured by the higher layer parameters are not used for other downlink control signals, the UE may use the multi-beam configuration procedure and the reception mechanism described above in the search space of the PoSS.

For example, the UE monitors the power saving signal carried by the PDCCH on the current default BWP, and the monitoring occasions end time and the DRX On duration starting position are offset for a long time. In the example, the number of SearchSpace sets that the UE is configured is four (such as SearchSpaceID=1, 2, 3, 4), the number of CORESETs are two, and one corresponding TCI state in each CORESET is associated with one QCL TypeD. The beam direction of the UE receiving PDCCH is the same as at least one of the CSI-RS and SSB indicated in the QCL TypeD. Thus, the UE can receive the PDCCH carrying the power saving signal by using up to 4 possible beam directions, which can greatly improve the reliability of detection.

For example, the UE monitors the power saving signal carried by the PDCCH on the current default BWP, and the monitoring occasions end time and the DRX On duration starting position are offset for a long time. In an example, the number of SearchSpace sets that the UE is configured is four (such as SearchSpaceID=1, 2, 3, 4), the number of CORESETs are two, and each CORESET is configured with four TCI states associated with one QCL TypeD. The beam direction of the UE receiving PDCCH is the same as at least one of the CSI-RS and SSB indicated in the QCL TypeD. In this way, the UE can receive the PDCCH carrying the power saving signal by using up to 16 possible beam directions. The probability of successful detection can be greatly improved.

For example, the UE monitors the power saving signal carried by the PDCCH on the current default BWP, and the monitoring occasions end time and the DRX On duration starting position are offset for a long time. In an example, the UE is configured to have 4 SearchSpace sets (such as SearchSpaceID=1, 2, 3, 4) and 2 CORESETs, and 4 TCI states in each CORESET are associated with at least one QCL TypeD hypothesis. The CSI-RS and SSB receive beam directions, and in the SearchSpaceID associated with the same CORESET, each searchSpace is configured with a different beam direction offset. In this way, the UE can receive the PDCCH carrying the power saving signal by using up to 64 possible beam directions. As a result, the UE is no longer affected by the beam direction offset.

This scheme can reduce the problem of poor performance of power saving signal monitoring due to large channel changes during outside Active time or FR2. It is also applicable to the search space or CORESET of power saving signal and DCI format 0_0/1_0 during outside Active Time.

Embodiment 6 (Increasing Channel Measurement)

In the outside Active Time, the UE configures an A-CSI-RS measurement and reporting by higher layer parameters before monitoring the PoSS, and the UE can obtain more accurate beam information according to the CORESET configuration, thereby improving monitoring performance of the power saving signal.

In some implementations, the power consumption of a slot measured by CSI-RS is shown in the following:

TABLE

Single-slot power consumption for CSI-RS measurement and PDCCH-only monitoring.

Figure 8:
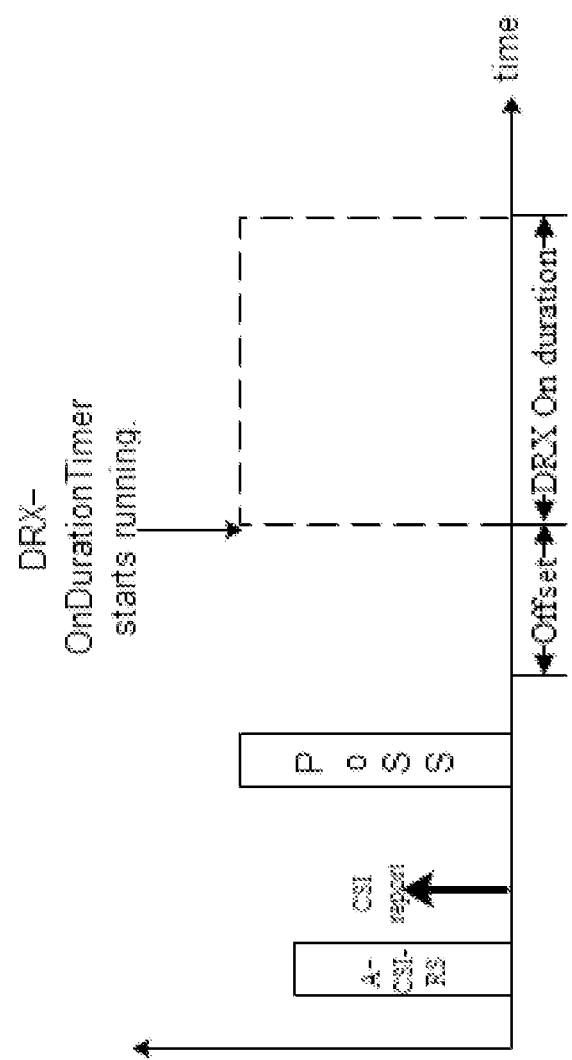
FIG. 8 shows an example of a power saving signal monitoring based on CSI measurement report.

For "PDCCH-only" and "SSB or CSI-RS processing" concurrent in a slot, the slot-averaged power is 0.85× the sum of the respective power, at least for FR1
   For FR1, 0.85* (100 + 100) = 170
   For FR2, 0.85* (175 + 175) = 300
For "SSB processing" and "CSI-RS processing" concurrent in a slot, the slot-averaged power is 0.85× the sum of the respective power, at least for FR1
   For FR1, 0.85* (100 + 100) = 170
   For FR2, 0.85* (175 + 175) = 300
   2-SSB within a slot is assumed The table above is the same as the power consumption of PDCCH-only. Thus, increasing the CSI-RS measurement can improve the monitoring performance of the power saving signal without additionally increasing excessive power consumption. This scenario should be set only if the DRX Off state lasts longer. This scheme can also be used to transmit power saving signals on the dedicated BWP, as shown in FIG. 8.

In some implementations, if the channel state measurement or synchronization can be performed before the power saving signal is monitored, a BLER or L1-RSRP threshold of the PoSS can be configured for the power saving signal. After the UE performs the measurement, it can compare the measurement with the configuration threshold and report the information to the base station.

Embodiment 7 (Restricting Time-Frequency Resource Allocation Mechanism)

In the DRX configuration, when the UE monitors the power saving signal during the outside Active Time, the following two schemes can be provided.
Scheme 1
In some implementations, if the gNB transmits the power saving signal on multiple Search Space and CORESET resources, the power saving signal can be repeatedly transmitted on the resources at a low bit rate $R_{low}$. In some implementations, the $R_{low}$ is not less than the real rate of the information bits 512 transmitted in the whole available time and frequency resource. In some implementations, the $R_{low}$ is not larger than the lowest rate in the lowSE-MCS table. This can improve the received signal quality and decoding performance of the UE on the receiving side. In some implementations, $R_{low}$ is the lowest code rate in the MCS table for low spectral efficiency in the PDSCH, or $1/N_{RE}^{max}$, where $N_{RE}^{max}$ is the maximum number of power saving information transmission REs configurable in a CORESET.

For example, on the current BWP, the transmission resource of the power saving signal is configured by three Search Spaces and three CORESETs, and the UE monitors the power saving signal on each resource according to the RRC signaling configuration information, and the monitored power saving is performed. The signal is superimposed, which ultimately improves the monitoring performance of the power saving signal.
Scheme 2
In the predefined configuration, the optional aggregation level for limiting the power saving signal is at least $L_{min}$. To ensure the monitoring performance of power saving signals, the pre-defined configuration refers to at least one of the following configuration information: 1) DRX cycle length $T_{DRX-cycle}$>T0; 2) duration of DRX-Off in the DRX cycle, $T_{DRX-Off}$>T1; 3) the interval between the end of the power saving signal monitoring occasions and the start position of the DRX On duration is offset<T2; 4) the number of time domain resource symbols occupied by the power saving signal is Nsymb<T3, or 5) FR type.

In some implementations, $L_{min}$≥4, T0<80 ms, T1<40 ms, T2>n slots, n≥0; T3>0, FR type is FR2.

For example, let's assume that on the current BWP, the DRX cycle is 640 ms, the DRX On duration Timer is 10 ms, and the DRX Inactivity Timer is 10 ms. Except for the retransmission-related timer duration, it is estimated that the DRX-Off state of the DRX cycle can be greater than 80 ms. Thus, the gNB will send a power saving signal with a frequency domain resource with an aggregation level of at least AL=4. The UE uses the {4,8,16}AL optional value set according to the RRC configuration or the predefined AL set. The PoSS can greatly reduce the number of PDCCH blind decoding of the UE and obtain power saving gain.

For example, on the current BWP, the DRX period is 320 ms>T0=80 ms. Therefore, the gNB sends a power saving signal using a frequency domain resource with an aggregation level of at least AL=4. According to the RRC configuration or the predefined AL set, the UE uses the {4, 8, 16} AL optional value set to monitor PoSS. Thus, it is possible to greatly reduce the number of blind detection of the UE and obtain power saving gain.
Scheme 3
The UE detects PoSS in the limited available time domain and frequency domain resource to reduce the monitoring power consumption of the UE.

In some implementations, the interval between the start position of the power saving signal monitoring occasions and the DRX On duration starting position is not greater than (offset+$T_m$), where the offset is separately configured for RRC signaling, or the power saving signal is searched. The offset is configured implicitly by search space and CORESET. The $T_m$ is in a unit of ms, and the range does not exceed N PoSS monitoring occasions.

FIG. 9 shows an example of a wireless communication scheme based on some implementations of the disclosed technology. At step 910, the user device monitors power saving indications transmitted from a network device during corresponding monitoring occasions predefined or configured by a higher layer parameter. In some implementations, the power saving indications include a first typed power saving indication or a second typed power saving indication. At step 920, the user device performs a next action based on a predefined condition.

Figure 10:
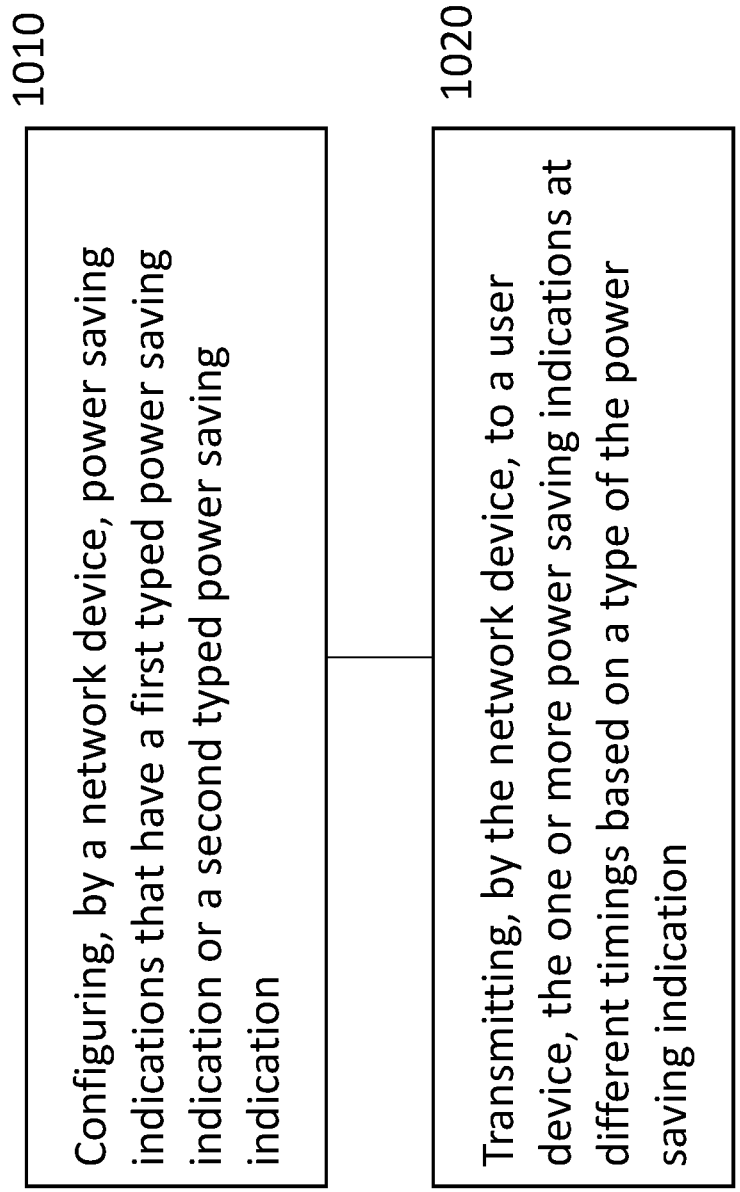

FIG. 10 shows another example of a wireless communication scheme based on some implementations of the disclosed technology. At step 1010, the network device configures power saving indications that have a first typed power saving indication or a second typed power saving indication. At step 1020, the network device transmits to the user device the one or more power saving indications at different timings based on a type of the power saving indication In some implementations, the N is not less than 1. Additional features and embodiments of the above-described methods/techniques are described below using a clause-based description format.

1. A wireless communication method, comprising: monitoring, by a user device, power saving indications transmitted from a network device during corresponding monitoring occasions predefined or configured by a higher layer parameter, the power saving indications including a first typed power saving indication or a second typed power saving indication; and performing a next action based on a predefined condition. The network device may include the BS 120 as shown in FIG. 1 and the user device may include the UE as shown in FIG. 1. In some implementations, the type of the power saving indication includes a first type or a second type as discussed in [0059] of this patent document. In some implementations, the Active Time and the outside Active Time mean the time period as discussed [0048] and [0049] of this patent document. In some implementations, the next action includes operations discussed with reference to Embodiments 0 to 7 as discussed above.

2. The method of clause 1, wherein the first typed power saving indication includes information including at least one of the following: i) whether to trigger the user device to monitor a PDCCH (Physical Downlink Control Channel) in subsequent one or more DRX (Discontinuous Reception)-On durations, ii) a minimum value of an offset, iii) a maximum number of MIMO layers; iv) a bandwidth part indicator; v) whether to disable or enable an indication of the minimum value of the offset in the second typed power saving indication; or vi) whether to disable or enable an indication of the maximum number of MIMO layers in the second typed power saving indication.

3. The method of clause 1, wherein the second typed power saving indication includes information including at least one of the following: i) a minimum value of an offset; ii) a maximum number of MIMO layers; or iii) a BWP (Bandwidth part) switching indication.

4. The method of Clause 2 or 3, wherein the minimum value of the offset includes at least one of a value for K0, K1, K2, A-CSI-RS trigger offset, or A-SRS trigger offset.

5. The method of clause 1, wherein the predefined condition includes a failure of a detection of the power saving indication.

6. The method of clause 1, 2 or 5, wherein, the next action includes an action that the user device monitors the PDCCH in a default duration.

7. The method of clause 1, 2 or 5, wherein, the next action includes an action that the user device assumes the minimum value of the offset as 0 in a default duration.

8. The method of clause 1, 2 or 5, wherein the next action includes an action that the user device assumes the maximum number of MIMO layers as being equal to a default value in a default duration, the default value being equal to 4 for an uplink transmission or 8 for a downlink transmission.

9. The method of clause 1, 2 or 5, wherein the next action includes an action that the user device assumes that the indication of the maximum number of MIMO layers in the second typed power saving indication is enabled in a default duration.

10. The method of clause 1, 2 or 5, wherein the next action includes an action that the user device assumes that the indication of the minimum value of the offset in the second typed power saving indication is enabled in a default duration.

11. The method of any one of clauses 5-10, wherein position information of the default duration is predefined or configured by the higher layer parameter, the default duration starting from a starting position that is a starting position of a DRX On duration, and having a length not larger than a length of a DRX On duration timer.

12. The method of clause 1, wherein the predefined condition includes a condition in which the user device detects N consecutive PDCCHs with invalid values, N being an integer not less than 1.

13. The method of clause 1, 2 or 12, wherein the next action includes an action that the user device assumes the minimum value of the offset as being equal to 0 in a fall-back duration.

14. The method of clause 1, 2 or 12, wherein the next action includes an action that the user device assumes that the maximum number of MIMO layers is a fall-back value in a fall-back duration, the fall-back value is equal to 4 for an uplink transmission or 8 for a downlink transmission.

15. The method of clause 13 or 14, wherein position information of the fall-back duration is predefined or configured by a higher layer parameter, the fall-back duration starting from a starting position that is a next subsequent slot n+1 if a N-th PDCCH is detected at a slot n, wherein n indicates a slot ID.

16. The method of clause 1, wherein the monitoring occasions of the first typed power saving indication is determined by a search space and CORESET (Control-Resource Set).

17. The method of claim 16, wherein a number of search spaces associated with the CORESET is not smaller than 1, a number of search space of the first power saving signal is not smaller than 1, a number of CORESET of the first typed power saving indication is not smaller than 1, a number of active TCI states of the CORESET of the first typed power saving signal is larger than 1, a number of active TCI states associated with a search space of the first typed power saving signal is not less than 1, and the active TCI states of the CORESET is associated with the search spaces associated with the CORESET according to a predefined order.

18. The method of clause 17, wherein the predefined order is a fixed mapping order between the TCI states ID and a search space ID or configured by a higher layer parameter.

19. The method of clause 16, wherein the search space and CORESET of the first typed power saving indication and the second typed power saving indication satisfies at least one of i) a maximum number of search spaces of the first typed power saving indication is not larger than that of the second typed power saving indication, ii) the number of active TCI states of a CORESET of the first typed power saving signal is larger than that of the second typed power saving signal, or iii) the active TCI states associated with a search space of the first typed power saving indication is not smaller than that of the second typed power saving indication.

20. The method of clause 1, 2, or 5, wherein the next action includes the user device to report an HARQ-ACK information of the first typed power saving indication based on HARQ-ACK information of a first PDSCH in an Active Time period of the user device.

21. The method of claim 20, wherein the HARQ-ACK information of the first PDSCH in the Active Time period has one reserved bit used for reporting the ACK information of the first typed power saving indication.

22. A wireless communication method comprising: configuring, by a network device, power saving indications that have a first typed power saving indication or a second typed power saving indication; and transmitting, by the network device, to a user device, the one or more power saving indications at different timings based on a type of the power saving indication. The network device may include the BS 120 as shown in FIG. 1 and the user device may include the UE as shown in FIG. 1. In some implementations, the type of the power saving indication includes a first type or a second type as discussed in [0059] of this patent document.

23. The method of clause 22, wherein the first typed power saving indication includes information including at least one of the following: i) whether to trigger the user device to monitor a PDCCH (Physical Downlink Control Channel) in subsequent one or more DRX (Discontinuous Reception)-On durations, ii) a minimum value of an offset, iii) a maximum number of MIMO layers; iv) a bandwidth par indicator; v) whether to disable or enable an indication of the minimum value of the offset in the second typed power saving indication; or vi) whether to disable or enable an indication of the maximum number of MIMO layers in the second typed power saving indication.

24. The method of clause 22, wherein the second typed power saving indication includes information including at least one of the following: i) a minimum value of an offset; ii) a maximum number of MIMO layers; or iii) a BWP switching indication.

25. The method of Clause 23 or 24, wherein the minimum value of the offset includes at least one of a value for K0, K1, K2, A-CSI-RS trigger offset, or A-SRS trigger offset.

26. A communication apparatus comprising a processor configured to implement a method recited in any one or more of clauses 1 to 25.

27. A computer readable medium having code stored thereon, the code, when executed, causing a processor to implement a method recited in any one or more of clauses 1 to 25.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communications, comprising:
monitoring, by a user device, power saving indications transmitted from a network device during corresponding monitoring occasions predefined or configured by a higher layer parameter, the power saving indications including a first type of a power saving indication transmitted outside an active time period of the user device and a second type of a power saving indication transmitted within the active time period; and
performing a next action,
wherein the next action includes:
determining whether to feedback the monitoring of the power saving indications based on power saving information indicated by the power saving indications or values of one or more indication domains in the power saving indications; and
reporting a hybrid automatic repeat request acknowledgement (HARQ-ACK) information of the first type of the power saving indication in case that a predefined condition on a reception of a downlink channel is satisfied.

2. The method of claim 1, wherein the next action further includes switching minimum offset to 0 or a default value in case that the second type of the power saving indication with updated minimum offset is not detected.

3. The method of claim 2, wherein the default value is a minimum value configured with the higher layer parameter.

4. The method of claim 1, wherein feedback on the monitoring of power saving indications includes a HARQ- ACK information indicating whether the power saving indications have been successfully received.

5. The method of claim 1, wherein a type of power saving indication indicates whether to activate or deactivate SCell dormant state.

6. The method of claim 5, wherein the user device feeds back a HARQ-ACK information bit value indicating ACK in case that the power saving indications have been successfully received.

7. The method of claim 1, wherein the HARQ-ACK information of the first type of the power saving indication is reported in case that the downlink channel is not received and a NACK (negative acknowledgement) information of the downlink channel is reported.

8. The method of claim 7, wherein the HARQ-ACK information is transmitted using an additional reserved one-bit field in a HARQ-ACK information of the downlink channel, the additional reserved one-bit field indicated by a control channel scheduling the downlink channel or configured by the higher layer parameter.

9. The method of claim 1, wherein the active time period is defined in a MAC (medium access control) layer.

10. The method of claim 1, wherein the determining determines to feedback the HARQ-ACK information of the power saving indication in case that all of the one or more indication domains in the power saving indication have a first value.

11. The method of claim 1, wherein feedback of the monitoring is provided after monitoring occasions of the first type of the power saving indication are ended.

12. The method of claim 11, wherein a start position of a feedback time domain resource is before a start position of a DRX (Discontinuous Reception) on-duration and an offset interval before the DRX on-duration.

13. The method of claim 1, wherein a number of active TCI (transmission control indicator) states associated with a search space of the first type of the power saving indication is greater than a number of search spaces of the first type of the power saving indication, or the active TCI states are associated with the search spaces according to a predefined order.

14. The method of claim 1, wherein a search space and CORESET (control resource set) of the first type of the power saving indication and the second type of the power saving indication satisfy at least one of: i) a number of active TCI (transmission control indicator) states of a CORESET of the first type of the power saving indication is greater than that of the second type of the power saving indication, or ii) active TCI states associated with a search space of the first type of the power saving indication is not smaller than that of the second type of the power saving indication.

15. An apparatus for wireless communications, comprising at least one processor configured to cause the apparatus to implement a method comprising:
  monitoring, by a user device, power saving indications transmitted from a network device during corresponding monitoring occasions predefined or configured by a higher layer parameter, the power saving indications including a first type of a power saving indication transmitted outside an active time period of the user device and a second type of a power saving indication transmitted within the active time period; and
  performing a next action, wherein the next action includes:
  determining whether to feedback the monitoring of the power saving indications based on power saving information indicated by the power saving indications or values of one or more indication domains in the power saving indications; and
  reporting a hybrid automatic repeat request acknowledgement (HARQ-ACK) information of the first type of the power saving indication in case that a predefined condition on a reception of a downlink channel is satisfied.

16. The apparatus of claim 15, wherein the next action further includes switching minimum offset to 0 or a default value in case that the second type of the power saving indication with updated minimum offset is not detected.

17. The apparatus of claim 15, wherein feedback on the monitoring of power saving indications includes a HARQ-ACK information indicating whether the power saving indications have been successfully received.

18. The apparatus of claim 15, wherein a type of power saving indication indicates whether to activate or deactivate SCell dormant state.

19. The apparatus of claim 18, wherein the user device is configured to feed back a HARQ-ACK information bit value indicating ACK in case that the power saving indications have been successfully received.

20. The apparatus of claim 15, wherein the HARQ-ACK information of the first type of the power saving indication is reported in case that the downlink channel is not received and a NACK (negative acknowledgement) information of the downlink channel is reported.

* * * * *